(12) United States Patent
Jiang et al.

(10) Patent No.: US 11,871,751 B2
(45) Date of Patent: *Jan. 16, 2024

(54) ANTIMICROBIAL PHASE-SEPARABLE GLASS/POLYMER ARTICLES AND METHODS FOR MAKING THE SAME

(71) Applicant: Corning Incorporated, Corning, NY (US)

(72) Inventors: Dayue Jiang, Painted Post, NY (US); Carlo Anthony Kosik Williams, Painted Post, NY (US); Kevin Andrew Vasilakos, Painted Post, NY (US); Frederic Christian Wagner, Lindley, NY (US)

(73) Assignee: CORNING INCORPORATED, Corning, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/388,073

(22) Filed: Jul. 29, 2021

(65) Prior Publication Data
US 2021/0352909 A1    Nov. 18, 2021

Related U.S. Application Data

(62) Division of application No. 16/072,722, filed as application No. PCT/US2017/014797 on Jan. 25, 2017, now Pat. No. 11,102,979.

(Continued)

(51) Int. Cl.
*A01N 25/00* (2006.01)
*A01N 59/20* (2006.01)
(Continued)

(52) U.S. Cl.
CPC ............. *A01N 59/20* (2013.01); *A01N 25/34* (2013.01); *C03C 4/0035* (2013.01); *C03C 10/00* (2013.01);
(Continued)

(58) Field of Classification Search
None
See application file for complete search history.

(56) References Cited

U.S. PATENT DOCUMENTS 9,622,483 B2    4/2017  Bookbinder et al.
11,102,979 B2 *  8/2021  Jiang ................. A01N 25/34
(Continued)

FOREIGN PATENT DOCUMENTS

CN         102112564 A     6/2011

OTHER PUBLICATIONS

Chinese Patent Application No. 201780008818.X, Office Action dated Jan. 28, 2021, 5 pages (English Translation Only); Chinese Patent Office.

(Continued)

*Primary Examiner* — Brian Gulledge
(74) *Attorney, Agent, or Firm* — Travis B. Gasa; Payal A. Patel; Michael A. Hood

(57) ABSTRACT

An antimicrobial article that includes: an antimicrobial composite region that includes a matrix comprising a polymeric material, and a first plurality of particles within the matrix. The particles include a phase-separable glass with a copper-containing antimicrobial agent. The antimicrobial composite region can be a film containing the first plurality of particles that is subsequently laminated to a bulk element. The first plurality of particles can also be pressed into the film or a bulk element to define an antimicrobial composite region. An exposed surface portion of the antimicrobial composite region can exhibit at least a log 2 reduction in a concentration of at least one of *Staphylococcus aureus*, *Enterobacter aerogenes*, and *Pseudomonas aeruginosa* bacteria under a Modified EPA Copper Test Protocol.

19 Claims, 5 Drawing Sheets

Related U.S. Application Data

(60) Provisional application No. 62/287,982, filed on Jan. 28, 2016.

(51) Int. Cl.
| | |
|---|---|
| *C03C 4/00* | (2006.01) |
| *C03C 10/00* | (2006.01) |
| *C08K 3/40* | (2006.01) |
| *A01N 25/34* | (2006.01) |
| *C08K 3/04* | (2006.01) |
| *C03C 14/00* | (2006.01) |
| *C08K 3/015* | (2018.01) |
| *C09K 9/00* | (2006.01) |

(52) U.S. Cl.
CPC .......... *C03C 14/004* (2013.01); *C03C 14/006* (2013.01); *C08K 3/04* (2013.01); *C08K 3/40* (2013.01); *C03C 2204/02* (2013.01); *C03C 2214/04* (2013.01); *C03C 2214/16* (2013.01); *C08K 3/015* (2018.01); *C09K 9/00* (2013.01)

(56) References Cited

U.S. PATENT DOCUMENTS

| | | | | |
|---|---|---|---|---|
| 2008/0139450 | A1* | 6/2008 | Madhyastha | A01N 47/44 424/443 |
| 2008/0171068 | A1 | 7/2008 | Wyner et al. | |
| 2009/0017086 | A1 | 1/2009 | Racquet | |
| 2010/0210745 | A1* | 8/2010 | McDaniel | C09D 7/48 521/55 |
| 2014/0212467 | A1 | 7/2014 | Chen et al. | |
| 2015/0225572 | A1 | 8/2015 | Jiang et al. | |
| 2015/0230476 | A1* | 8/2015 | Bookbinder | A01N 59/00 424/602 |

OTHER PUBLICATIONS

Esteban-Tejeda et al; "Antibacterial and Antifungal Activity of a Soda-Lime Glass Containing Copper Nanoparticles"; Nanotechnology, 20, (2009) 6 Pages.

European Patent Application No. 17707426.7 Communication under Rule 71(3) EPC dated Nov. 12, 2019; 6 Pages; European Patent Office.

European Patent Application No. 17707426.7 Decision to grant a European patent dated Mar. 26, 2020; 2 Pages; European Patent Office.

International Preliminary Report on Patentability of the International Searching Authority; PCT/US2017/014797; dated Aug. 9, 2018; 8 Pages; European Patent Office.

International Search Report and Written Opinion of the International Searching Authority; PCT/US2017/014797; dated May 10, 2017; 9 Pages; European Patent Office.

IPMX(Registered) Industries, Inc. Microguard(Trademark) Antimicrobial Copper Overview; 2 Pages; (2009).

* cited by examiner

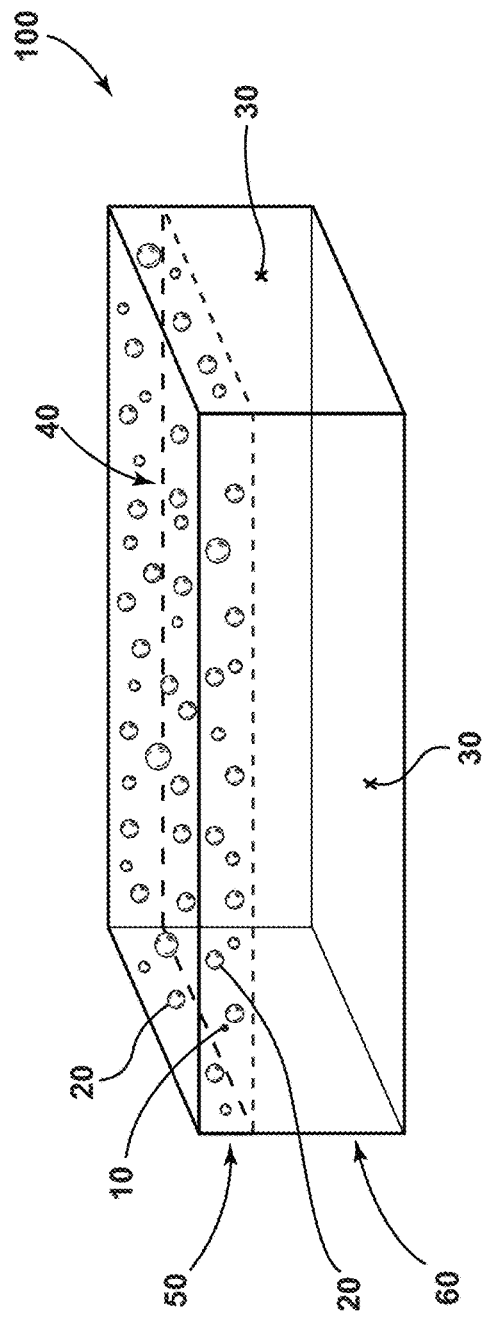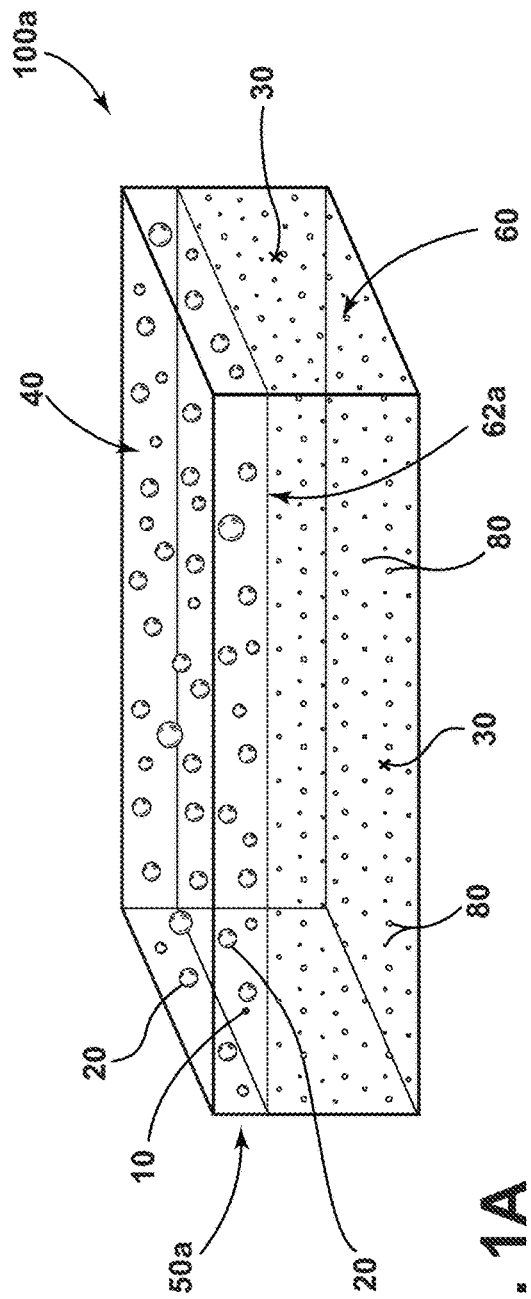

ANTIMICROBIAL PHASE-SEPARABLE GLASS/POLYMER ARTICLES AND METHODS FOR MAKING THE SAME

CROSS-REFERENCE TO RELATED APPLICATIONS

This application is a divisional application and claims the benefit of priority under 35 U.S.C. § 120 of U.S. application Ser. No. 16/072,722, filed on Jul. 25, 2018, which, in turn, claims the benefit of priority under 35 U.S.C. § 371 of International Application Serial No. PCT/US2017/014797, filed on Jan. 25, 2017, which, in turn, claims the benefit of priority under 35 U.S.C. § 119 of U.S. Provisional Application Ser. No. 62/287,982, filed on Jan. 28, 2016, the contents of which are relied upon and incorporated herein by reference in its entirety.

BACKGROUND

The present disclosure relates generally to antimicrobial articles and methods for making them. More particularly, the various embodiments described herein relate to glass/polymer composite antimicrobial articles having copper-containing antimicrobial agents and various methods for making them.

Consumer electronics articles, including touch-activated or touch-interactive devices, such as screen surfaces (e.g., surfaces of electronic devices having user-interactive capabilities that are activated by touching specific portions of the surfaces), have become increasingly more prevalent. As the extent to which the touch screen-based interactions between a user and a device increases, so too does the likelihood of the surface harboring microorganisms (e.g., bacteria, fungi, viruses, and the like) that can be transferred from user to user. Moreover, the housings which incorporate the touch-activated or touch-interactive devices also include surfaces that harbor such microorganisms that can be transferred from user to user. The concern of microorganism transfer is also a concern with many "high touch" surfaces associated with various electronic equipment, furniture and architectural articles, counter-tops, table-tops, door knobs, rails, elevator control panels, other device control panels, along with other articles used in medical, office and consumer settings in which users, consumers or the like come into contact with these such "high touch" surfaces.

To minimize the presence of microbes on various materials, so-called "antimicrobial" properties have been imparted to a variety of glasses; however, there is a need to provide entire articles (including the housing and any glasses used as cover glass) that also exhibit antimicrobial properties. Accordingly, antimicrobial articles useful for certain applications should be durable enough for the purpose for which they are used, while also providing continuous antimicrobial properties that are passive or do not require additional activation by a user or outside source (e.g., UV light). In addition, antimicrobial glasses and articles should provide controlled antimicrobial activity.

In some situations, polymer/glass composite articles intended to exhibit antimicrobial properties demonstrate far less antimicrobial efficacy. One problem associated with such articles is ensuring that the antimicrobial agents are present at the surfaces of these articles at a concentration sufficient to provide the desired antimicrobial efficacy. Another problem is ensuring that the microbes present on the surfaces of such articles are in residence for a sufficient duration to be killed or neutralized by the antimicrobial agents within the composite articles.

In certain situations, polymer/glass composite articles intended to exhibit antimicrobial properties do so with a reduction in other properties important to the intended application and/or are too costly for the given application. For example, one such problem is ensuring that the articles containing the antimicrobial agents do not exhibit a reduction in application-related, mechanical and/or optical properties from the presence of such agents. Another problem is ensuring that the quantity of antimicrobial agents incorporated within the articles is carefully controlled to achieve the necessary efficacy given that the relative cost of the antimicrobial agents themselves can be high. A further problem is that the exposed surface or surfaces of some conventional antimicrobial articles can require additional costly surface treatments and other processing steps to properly expose the antimicrobial agents in these articles to achieve required antimicrobial efficacy levels. Further, some of these treatments can degrade or otherwise alter mechanical and/or optical properties associated with the antimicrobial article.

Accordingly, there is a need for antimicrobial articles, including polymer/glass composite articles, possessing exterior surfaces that can be configured to produce desired antimicrobial efficacy levels without detriment to other properties and/or with reduced cost, along with processes for making the same.

SUMMARY

A first principal implementation of the disclosure pertains to an antimicrobial article that includes: an antimicrobial composite region that includes a matrix comprising a polymeric material, and a first plurality of particles (e.g., second phase particles) within the matrix. The particles include a phase-separable glass with a copper-containing antimicrobial agent.

The first plurality of particles of the antimicrobial article in some aspects can include phase-separable glass that includes at least one of $B_2O_3$, $P_2O_5$ and $R_2O$, and the antimicrobial agent is cuprite which includes a plurality of $Cu^{1+}$ ions. In certain aspects, the plurality of second phase particles has a size distribution defined by a 325 standard US mesh size. Further, the phase-separable glass can comprise between about 10 and 50 mol % cuprite.

In some aspects, a bulk element can be employed as part of the antimicrobial article. The bulk element and the matrix of the antimicrobial composite region can include a polymeric material selected from the group consisting of a polypropylene, a polyolefin and a polysulfone. In certain aspects, the polymeric material of the bulk element and the matrix of the antimicrobial composite region can be characterized by substantial hydrophobicity, while the exposed surface portion of the matrix and/or bulk element is characterized by substantial hydrophilicity. Other aspects of the antimicrobial article employ a bulk element, a matrix (i.e., of the antimicrobial composite region) and an exposed surface portion of the matrix and/or bulk element that include a polymeric material characterized by substantial hydrophilicity. In addition, the exposed surface portion of the article can comprise functional groups derived from a plasma treatment of the matrix.

According to some implementations of the antimicrobial article, the antimicrobial composite region is an antimicrobial composite film that is laminated to the primary surface of a bulk element. In this configuration, the bulk element can be devoid of particles that include a phase-separable glass with a copper-containing antimicrobial agent. The matrix of the antimicrobial composite film and the bulk element can be fabricated from the same, or a substantially similar, polymeric material in some embodiments of these articles. In certain implementations, the bulk element can include a second plurality of particles with the same or different mechanical properties as the polymeric material of the bulk element. For example, the second plurality of particles can exhibit a higher elastic modulus than the polymeric material of the bulk element and thus serve to reinforce the bulk element. According to a further embodiment of these antimicrobial articles, the particles that include a phase-separable glass with a copper-containing antimicrobial agent can be pressed, embossed or otherwise injected into the antimicrobial composite film.

According to another implementation of the antimicrobial article, the antimicrobial composite region extends from the primary surface of a bulk element to a first selected depth within the element and the bulk element has a composition that includes a polymeric material. In this configuration, a portion of the bulk element beneath the antimicrobial composite region can be devoid of particles that include a phase-separable glass with a copper-containing antimicrobial agent. In certain embodiments, the bulk element can be in the form of a film; consequently, the antimicrobial article in these embodiments is also in the form of a film. In certain other implementations of these articles, the bulk element (e.g., beneath the antimicrobial composite region) can include a second plurality of particles with the same or different mechanical properties as the polymeric material of the bulk element. For example, the second plurality of particles can exhibit a higher elastic modulus than the polymeric material of the bulk element. According to a further embodiment of these antimicrobial articles, the particles that include a phase-separable glass with a copper-containing antimicrobial agent can be pressed, embossed or otherwise injected into the bulk element to the first selected depth.

According to some embodiments of the antimicrobial articles in which the antimicrobial composite region is a film laminated to the primary surface of the bulk element, an exposed surface portion of the film is configured as a high touch surface of a cover screen for a display device, a housing for a display device, a counter-top, a table-top, a door knob, a rail, an elevator control panel or another comparable device or element with a high touch surface. In other embodiments of the antimicrobial articles in which the antimicrobial composite region extends from the primary surface of the bulk element to a first selected depth, the primary surface of the bulk element (i.e., an exposed surface portion of the antimicrobial composite region) can likewise be configured as a high touch surface of a cover screen for a display device, a housing for a display device, a counter-top, a table-top, a door knob, a rail, an elevator control panel or another comparable device or element with a high touch surface.

In some implementations of the antimicrobial article, an exposed surface portion of the antimicrobial composite region exhibits at least a log 2 reduction in a concentration of at least one of *Staphylococcus aureus, Enterobacter aerogenes*, and *Pseudomonas aeruginosa* bacteria under modified United States Environmental Protection Agency "Test Method for Efficacy of Copper Alloy Surfaces as a Sanitizer" testing conditions, wherein the modified conditions include substitution of the antimicrobial article with the copper-containing surface prescribed in the Method and use of a copper metal article as the prescribed control sample in the Method (collectively, the "Modified EPA Copper Test Protocol"). In certain aspects, the exposed surface portion can exhibit at least a log 3, log 4, or even a log 5, reduction of the same bacteria under the same Modified EPA Copper Test Protocol test conditions.

A second principal implementation of the disclosure pertains to a method of making an antimicrobial article, including the steps: mixing particles that include a phase-separable glass with a copper-containing antimicrobial agent with a matrix precursor that includes polymeric particles to define an antimicrobial mix; and forming the antimicrobial mix into an antimicrobial composite film that includes a matrix and a first plurality of particles within the matrix. In certain aspects, the method also can include a step of affixing the antimicrobial composite film to a primary surface of a bulk element. In other aspects, the antimicrobial article is the antimicrobial composite film. Other embodiments of the method further include a step of melting the matrix precursor of the antimicrobial mix to provide a dispersion of the first plurality of particles, and the polymeric particles are thermoplastic particles. In an additional embodiment, the forming step includes extruding the antimicrobial mix into the antimicrobial composite film, and the polymeric particles are thermoplastic particles.

According to certain aspects of the foregoing implementation, the method can further include a treating step after the forming step. In particular, the treating step can include abrading the antimicrobial composite film to define or otherwise reveal an exposed portion of the matrix and the first plurality of particles (e.g., particles containing a phase-separable glass with a copper-containing agent). The abrading can be conducted with hand sanding, grit blasting or other similar grinding and/or polishing techniques. In other aspects of the method, the treating step can include abrading and plasma-treating the antimicrobial composite film to define or otherwise reveal an exposed portion of the matrix and the first plurality of particles. In these implementations, the abrading can be performed before the plasma-treating or vice versa. Further, the plasma-treating can conducted with any of a variety of known processes that produce or otherwise create functional groups in the exposed portion of the matrix.

A third principal implementation of the disclosure pertains to a method of making an antimicrobial article, including the steps: forming a bulk element having a primary surface that includes a polymeric material; and pressing particles that include a phase-separable glass with a copper-containing antimicrobial agent into the primary surface of the bulk element to define an antimicrobial composite region. The antimicrobial composite region includes: (a) a matrix comprising a polymeric material; and (b) a first plurality of the particles within the matrix at a volume fraction. In an embodiment of this method, the bulk element is a film, the pressing step includes embossing the particles into the primary surface of the bulk element, and the antimicrobial composite region is an antimicrobial composite film. In certain embodiments, the method can further include a step of affixing the antimicrobial composite film to a primary surface of a second bulk element. In other embodiments of the method, the pressing step includes embossing the particles into the primary surface of the bulk element to define the antimicrobial composite region, and the antimicrobial composite region extends from the primary surface of the bulk element to a first selected depth.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a schematic, perspective view of an antimicrobial article to one implementation of the disclosure that includes a bulk element and an antimicrobial composite region that includes a matrix and a first plurality of second phase particles containing an antimicrobial agent.

FIG. 1A is a schematic, perspective view of an antimicrobial article according to another implementation of the disclosure that includes a bulk element and an antimicrobial composite region in the form of an antimicrobial composite film.

DETAILED DESCRIPTION

Figure 1B:
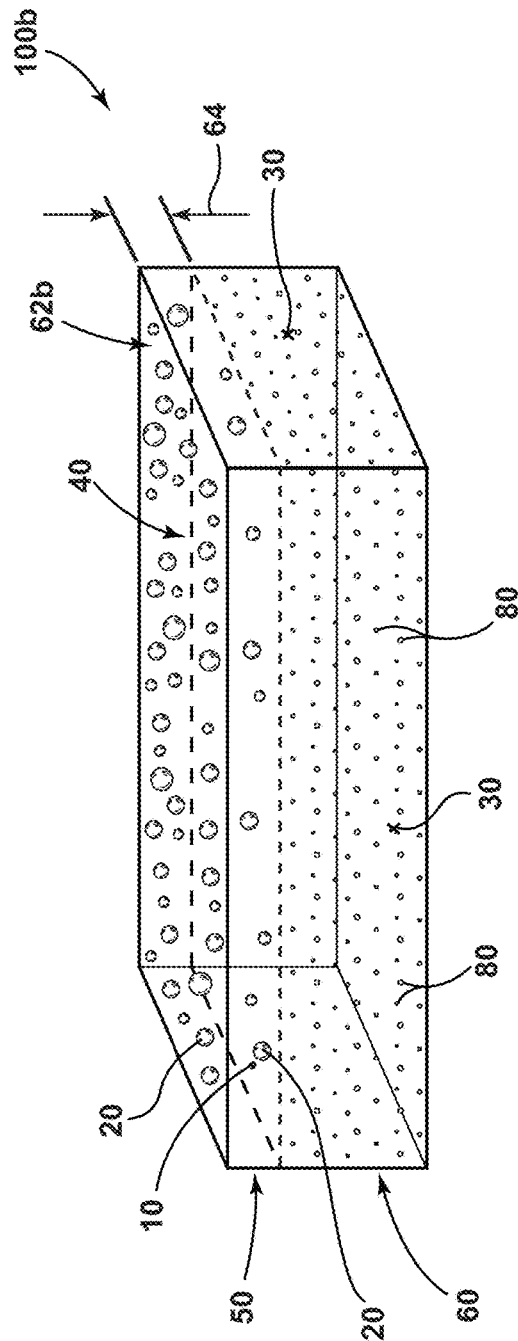
FIG. 1B is a schematic, perspective view of an antimicrobial article according to a further implementation of the disclosure that includes a bulk element and an antimicrobial composite region in which second phase particles containing an antimicrobial agent are pressed into the primary surface of the bulk element.

Reference will now be made in detail to various embodiment(s), examples of which are illustrated in the accompanying drawings.

Aspects of the disclosure generally pertain to antimicrobial articles that include second phase particles comprising glass compositions with antimicrobial properties. The antimicrobial properties of the glasses disclosed herein include antiviral and/or antibacterial properties. As used herein the term "antimicrobial," means a material, or a surface of a material that will kill or inhibit the growth of bacteria, viruses and/or fungi. The term as used herein does not mean the material or the surface of the material will kill or inhibit the growth of all species of microbes within such families, but that it will kill or inhibit the growth of one or more species of microbes from such families.

As used herein the term "log reduction" means-log ($C_a/C_0$), where $C_a$=the colony form unit (CFU) number of the antimicrobial surface and $C_0$=the colony form unit (CFU) of the control surface that is not an antimicrobial surface. As an example, a "3 log" reduction equals about 99.9% of the bacteria, viruses and/or fungi killed. Similarly, a "5 log" reduction equals about 99.999% of bacteria, viruses and/or fungi killed.

Referring to FIG. 1, an antimicrobial article 100 is provided in an exemplary, schematic form. The article 100, as shown, includes a bulk element 60 having a primary, exterior surface 40. In other aspects, the article 100 does not include a bulk element 60 (not shown). Independent of the presence of a bulk element 60, the article 100 includes an antimicrobial composite region 50 that comprises a matrix 10 that comprises, consists essentially of or consists of a polymeric material. The antimicrobial composite region 50 also includes a plurality of second phase particles 20 within the matrix 10. The particles 20 comprise a phase-separable glass with a copper-containing antimicrobial agent. As also depicted in FIG. 1, the primary surface 40 of the article 100 includes an exposed surface portion of the matrix 10 and second phase particles 20.

Further, the plurality of particles 20 is distributed within the matrix 10 at a second phase volume fraction. In some embodiments, the plurality of particles are distributed at a second phase volume fraction that ranges from 0.1% to 50%, or more specifically, between 1% and 30%, and more from 5% to 25%. These ranges reflect a balance between ensuring antimicrobial efficacy for the article 100 and minimizing the impact of the second phase particles 20 on the mechanical properties of the article 100.

As outlined earlier, the second phase particles 20 include a phase-separable glass with a copper-containing antimicrobial agent. One example of the phase separable glass employed in the particles 20 is described in U.S. patent application Ser. No. 14/623,077, filed on Feb. 16, 2015 and published as U.S. Patent Publication No. 2015/0230476 on Aug. 20, 2015, the salient portions of which related to phase-separable glass are hereby incorporated by reference within this disclosure. In one or more embodiments, the phase-separable glasses employed in the second phase particles 20 include a Cu species. In one or more alternative embodiments, the Cu species may include $Cu^{1+}$, $Cu^0$, and/or $Cu^{2+}$. The combined total of the Cu species may be about 10 wt % or more. However, as will be discussed in more detail below, the amount of $Cu^{2+}$ is minimized or is reduced such that the antimicrobial glass is substantially free of $Cu^{2+}$. The $Cu^{1+}$ ions may be present on or in the surface and/or the bulk of the antimicrobial glass. In some embodiments, the $Cu^{1+}$ ions are present in the glass network and/or the glass matrix of the antimicrobial glass. Where the $Cu^{1+}$ ions are present in the glass network, the $Cu^{1+}$ ions are atomically bonded to the atoms in the glass network. Where the $Cu^{1+}$ ions are present in the glass matrix, the $Cu^{1+}$ ions may be present in the form of $Cu^{1+}$ crystals that are dispersed in the glass matrix. In some embodiments the $Cu^{1+}$ crystals include cuprite ($Cu_2O$). In such embodiments, where $Cu^{1+}$ crystals are present, the material may be referred to as an antimicrobial glass ceramic, which is intended to refer to a specific type of glass with crystals that may or may not be subjected to a traditional ceramming process by which one or more crystalline phases are introduced and/or generated in the glass. Where the $Cu^{1+}$ ions are present in a non-crystalline form, the material may be referred to as an antimicrobial glass. In some embodiments, both $Cu^{1+}$ crystals and $Cu^{1+}$ ions not associated with a crystal are present in the antimicrobial glasses described herein.

In one or more aspects of the antimicrobial article 100, the antimicrobial glass employed in the second phase particles 20 may be formed from a composition that can include, in mole percent, $SiO_2$ in the range from about 40 to about 70, $Al_2O_3$ in the range from about 0 to about 20, a copper-containing oxide in the range from about 10 to about 30, CaO in the range from about 0 to about 15, MgO in the range from about 0 to about 15, $P_2O_5$ in the range from about 0 to about 25, $B_2O_3$ in the range from about 0 to about 25, $K_2O$ in the range from about 0 to about 20, ZnO in the range from about 0 to about 5, $Na_2O$ in the range from about 0 to about 20, and/or $Fe_2O_3$ in the range from about 0 to about 5. In such embodiments, the amount of the copper-containing oxide is greater than the amount of $Al_2O_3$. In some embodiments, the composition may include a content of $R_2O$, where R may include K, Na, Li, Rb, Cs and combinations thereof.

In the embodiments of the compositions described herein, $SiO_2$ serves as the primary glass-forming oxide. The amount of $SiO_2$ present in a composition should be enough to provide glasses that exhibit the requisite chemical durability suitable for its use or application within the antimicrobial article 100 (e.g., applications with one or more "high touch" surfaces, article housings, etc.). The upper limit of $SiO_2$ may be selected to control the melting temperature of the compositions described herein. For example, excess $SiO_2$ could drive the melting temperature at 200 poise to high temperatures at which defects such as fining bubbles may appear or be generated during processing and in the resulting glass. Furthermore, compared to most oxides, $SiO_2$ decreases the compressive stress created by an ion exchange process of the resulting glass. In other words, glass formed from compositions with excess $SiO_2$ may not be ion-exchangeable to the same degree as glass formed from compositions without excess $SiO_2$. Additionally or alternatively, $SiO_2$ present in the compositions according to one or more embodiments could increase the plastic deformation prior break properties of the resulting glass. An increased $SiO_2$ content in the glass formed from the compositions described herein may also increase the indentation fracture threshold of the glass.

In one or more aspects of the antimicrobial article 100, the composition of the glass employed in the second phase particles 20 includes $SiO_2$ in an amount, in mole percent, in the range from about 40 to about 70, from about 40 to about 69, from about 40 to about 68, from about 40 to about 67, from about 40 to about 66, from about 40 to about 65, from about 40 to about 64, from about 40 to about 63, from about 40 to about 62, from about 40 to about 61, from about 40 to about 60, from about 41 to about 70, from about 42 to about 70, from about 43 to about 70, from about 44 to about 70, from about 45 to about 70, from about 46 to about 70, from about 47 to about 70, from about 48 to about 70, from about 49 to about 70, from about 50 to about 70, from about 41 to about 69, from about 42 to about 68, from about 43 to about 67 from about 44 to about 66 from about 45 to about 65, from about 46 to about 64, from about 47 to about 63, from about 48 to about 62, from about 49 to about 61, from about 50 to about 60 and all ranges and sub-ranges therebetween.

In one or more aspects of the antimicrobial article 100, the composition of the glass employed in the second phase particles 20 includes $Al_2O_3$ in an amount, in mole percent, in the range from about 0 to about 20, from about 0 to about 19, from about 0 to about 18, from about 0 to about 17, from about 0 to about 16, from about 0 to about 15, from about 0 to about 14, from about 0 to about 13, from about 0 to about 12, from about 0 to about 11 from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of $Al_2O_3$. As used herein, the phrase "substantially free" with respect to the components of the composition and/or resulting glass means that the component is not actively or intentionally added to the compositions during initial batching or subsequent post processing (e.g., ion exchange process), but may be present as an impurity. For example, a glass may be described as being substantially free of a component, when the component is present in an amount of less than about 0.01 mol %.

The amount of $Al_2O_3$ may be adjusted to serve as a glass-forming oxide and/or to control the viscosity of molten compositions within the glass employed in the second phase particles 20. Without being bound by theory, it is believed that when the concentration of alkali oxide ($R_2O$) in a composition is equal to or greater than the concentration of $Al_2O_3$, the aluminum ions are found in tetrahedral coordination with the alkali ions acting as charge-balancers. This tetrahedral coordination greatly enhances various post-processing (e.g., ion exchange process) of glasses formed from such compositions. Divalent cation oxides (RO) can also charge balance tetrahedral aluminum to various extents. While elements such as calcium, zinc, strontium, and barium behave equivalently to two alkali ions, the high field strength of magnesium ions causes them to not fully charge balance aluminum in tetrahedral coordination, resulting in the formation of five- and six-fold coordinated aluminum. Generally, $Al_2O_3$ can play an important role in ion-exchangeable compositions and strengthened glasses since it enables a strong network backbone (i.e., high strain point) while allowing for the relatively fast diffusivity of alkali ions. However, when the concentration of $Al_2O_3$ is too high, the composition may exhibit lower liquidus viscosity and, thus, $Al_2O_3$ concentration may be controlled within a reasonable range. Moreover, as will be discussed in more detail below, excess $Al_2O_3$ has been found to promote the formation of $Cu^{2+}$ ions, instead of the desired $Cu^{1+}$ ions.

In one or more aspects of the antimicrobial article 100, the composition of the glass employed in the second phase particles 20 includes a copper-containing oxide in an amount, in mole percent, in the range from about 10 to about 50, from about 10 to about 49, from about 10 to about 48, from about 10 to about 47, from about 10 to about 46, from about 10 to about 45, from about 10 to about 44, from about 10 to about 43, from about 10 to about 42, from about 10 to about 41, from about 10 to about 40, from about 10 to about 39, from about 10 to about 38, from about 10 to about 37, from about 10 to about 36, from about 10 to about 35, from about 10 to about 34, from about 10 to about 33, from about 10 to about 32, from about 10 to about 31, from about 10 to about 30, from about 10 to about 29, from about 10 to about 28, from about 10 to about 27, from about 10 to about 26, from about 10 to about 25, from about 10 to about 24, from about 10 to about 23, from about 10 to about 22, from about 10 to about 21, from about 10 to about 20, from about 11 to about 50, from about 12 to about 50, from about 13 to about 50, from about 14 to about 50, from about 15 to about 50, from about 16 to about 50, from about 17 to about 50, from about 18 to about 50, from about 19 to about 50, from about 20 to about 50, from about 10 to about 30, from about 11 to about 29, from about 12 to about 28, from about 13 to about 27, from about 14 to about 26, from about 15 to about 25, from about 16 to about 24, from about 17 to about 23, from about 18 to about 22, from about 19 to about 21 and all ranges and sub-ranges therebetween. In one or more specific embodiments, the copper-containing oxide may be present in the composition in an amount of about 20 mole percent, about 25 mole percent, about 30 mole percent or about 35 mole percent. The copper-containing oxide may include CuO, $Cu_2O$ and/or combinations thereof.

The copper-containing oxides in the composition form the $Cu^{1+}$ ions present in the resulting glass. Copper may be present in the composition and/or the glasses including the composition in various forms including $Cu^0$, $Cu^{1+}$, and $Cu^{2+}$. Copper in the $Cu^0$ or $Cu^{1+}$ forms provide antimicrobial activity. However, forming and maintaining these states of antimicrobial copper are difficult and often, in known compositions, $Cu^{2+}$ ions are formed instead of the desired $Cu^0$ or $Cu^{1+}$ ions.

In one or more aspects of the antimicrobial article 100, the amount of copper-containing oxide in the glass of the second phase particles 20 is greater than the amount of $Al_2O_3$ in the composition. Without being bound by theory it is believed that an approximately equal amount of copper-containing oxides and $Al_2O_3$ in the composition results in the formation of tenorite (CuO) instead of cuprite ($Cu_2O$). The presence of tenorite decreases the amount of $Cu^{1+}$ in favor of $Cu^{2+}$ and thus leads to reduced antimicrobial activity. Moreover, when the amount of copper-containing oxides is about equal to the amount of $Al_2O_3$, aluminum prefers to be in a four-fold coordination and the copper in the composition and resulting glass remains in the $Cu^{2+}$ form so that the charge remains balanced. Where the amount of copper-containing oxide exceeds the amount of $Al_2O_3$, then it is believed that at least a portion of the copper is free to remain in the $Cu^{1+}$ state, instead of the $Cu^{2+}$ state, and thus the presence of $Cu^{1+}$ ions increases.

In one or more aspects of the antimicrobial article 100, the composition of one or more embodiments of the glass of the second phase particles 20 includes $P_2O_5$ in an amount, in mole percent, in the range from about 0 to about 25, from about 0 to about 22, from about 0 to about 20, from about 0 to about 18, from about 0 to about 16, from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition includes about 10 mole percent or about 5 mole percent $P_2O_5$ or, alternatively, may be substantially free of $P_2O_5$.

In one or more embodiments, $P_2O_5$ forms at least part of a less durable phase or a degradable phase in the glass employed in the second phase particles 20 of the antimicrobial article 100. The relationship between the degradable phase(s) of the glass and antimicrobial activity is discussed in greater detail herein. In one or more embodiments, the amount of $P_2O_5$ may be adjusted to control crystallization of the composition and/or glass during forming. For example, when the amount of $P_2O_5$ is limited to about 5 mol % or less or even 10 mol % or less, crystallization may be minimized or controlled to be uniform. However, in some embodiments, the amount or uniformity of crystallization of the composition and/or glass may not be of concern and thus, the amount of $P_2O_5$ utilized in the composition may be greater than 10 mol %.

In one or more embodiments, the amount of $P_2O_5$ in the composition may be adjusted based on the desired damage resistance of the glass employed in the second phase particles 20 of the antimicrobial article 100, despite the tendency for $P_2O_5$ to form a less durable phase or a degradable phase in the glass. Without being bound by theory, $P_2O_5$ can decrease the melting viscosity relative to $SiO_2$. In some instances, $P_2O_5$ is believed to help to suppress the zircon (i.e., zirconium silicate) breakdown viscosity, i.e., the viscosity at which zircon breaks down to form $ZrO_2$; consequently, $P_2O_5$ may be more effective in this regard than $SiO_2$. When glass is to be chemically strengthened via an ion exchange process, $P_2O_5$ can improve the diffusivity and decrease ion exchange times, when compared to other components that are sometimes characterized as network formers (e.g., $SiO_2$ and/or $B_2O_3$).

In one or more aspects of the antimicrobial article 100, the composition of one or more embodiments of the glass of the second phase particles 20 includes $B_2O_3$ in an amount, in mole percent, in the range from about 0 to about 25, from about 0 to about 22, from about 0 to about 20, from about 0 to about 18, from about 0 to about 16, from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition includes a non-zero amount of $B_2O_3$, which may be, for example, about 10 mole percent or about 5 mole percent. The composition of some embodiments may be substantially free of $B_2O_3$.

In one or more embodiments, $B_2O_3$ forms a less durable phase or a degradable phase in the glass employed in the second phase particles 20 of the antimicrobial article 100. The relationship between the degradable phase(s) of the glass and antimicrobial activity is discussed in greater detail herein. Without being bound by theory, it is believed the inclusion of $B_2O_3$ in compositions imparts damage resistance in glasses incorporating such compositions, despite the tendency for $B_2O_3$ to form a less durable phase or a degradable phase in the glass. The composition of one or more embodiments includes one or more alkali oxides ($R_2O$) (e.g., $Li_2O$, $Na_2O$, $K_2O$, $Rb_2O$ and/or $Cs_2O$). In some embodiments, the alkali oxides modify the melting temperature and/or liquidus temperatures of such compositions. In one or more embodiments, the amount of alkali oxides may be adjusted to provide a composition exhibiting a low melting temperature and/or a low liquidus temperature. Without being bound by theory, the addition of alkali oxide(s) may increase the coefficient of thermal expansion (CTE) and/or lower the chemical durability of the antimicrobial glasses that include such compositions. In some cases, these attributes may be altered dramatically by the addition of alkali oxide(s).

In one or more aspects of the antimicrobial article 100, the composition of one or more embodiments of the glass of the second phase particles 20 may include one or more divalent cation oxides, such as alkaline earth oxides and/or ZnO. Such divalent cation oxides may be included to improve the melting behavior of the compositions.

In one or more aspects of the antimicrobial article 100, the composition of one or more embodiments of the glass of the second phase particles 20 may include CaO in an amount, in mole percent, in the range from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of CaO.

In one or more aspects of the antimicrobial article 100, the composition of one or more embodiments of the glass of the second phase particles 20 may include MgO in an amount, in mole percent, in the range from about 0 to about 15, from about 0 to about 14, from about 0 to about 13, from about 0 to about 12, from about 0 to about 11, from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of MgO.

In one or more aspects of the antimicrobial article 100, the composition of one or more embodiments of the glass of the second phase particles 20 may include ZnO in an amount, in mole percent, in the range from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of ZnO.

In one or more aspects of the antimicrobial article 100, the composition of one or more embodiments of the glass of the second phase particles 20 may include $Fe_2O_3$, in mole percent, in the range from about 0 to about 5, from about 0 to about 4, from about 0 to about 3, from about 0 to about 2, from about 0 to about 1, from about 0.1 to about 1, from about 0.2 to about 1, from about 0.3 to about 1 from about 0.4 to about 1 from about 0.5 to about 1, from about 0 to about 0.5, from about 0 to about 0.4, from about 0 to about 0.3 from about 0 to about 0.2, from about 0 to about 0.1 and all ranges and sub-ranges therebetween. In some embodiments, the composition is substantially free of $Fe_2O_3$.

In one or more aspects of the antimicrobial article 100, the composition of one or more embodiments of the glass of the second phase particles 20 may include one or more colorants. Examples of such colorants include NiO, $TiO_2$, $Fe_2O_3$, $Cr_2O_3$, $Co_3O_4$ and other known colorants. In some embodiments, the one or more colorants may be present in an amount in the range up to about 10 mol %. In some instances, the one or more colorants may be present in an amount in the range from about 0.01 mol % to about 10 mol %, from about 1 mol % to about 10 mol %, from about 2 mol % to about 10 mol %, from about 5 mol % to about 10 mol %, from about 0.01 mol % to about 8 mol %, or from about 0.01 mol % to about 5 mol %. In some aspects, the colorant employed in the second phase particles 20 is selected to match the color of the matrix 10 and/or bulk element 60 employed in the antimicrobial article 100.

In one or more aspects of the antimicrobial article 100, the composition of one or more embodiments of the glass of the second phase particles 20 may include one or more nucleating agents. Exemplary nucleating agents include $TiO_2$, $ZrO_2$ and other known nucleating agents in the art. The composition can include one or more different nucleating agents. The nucleating agent content of the composition may be in the range from about 0.01 mol % to about 1 mol %. In some instances, the nucleating agent content may be in the range from about 0.01 mol % to about 0.9 mol %, from about 0.01 mol % to about 0.8 mol %, from about 0.01 mol % to about 0.7 mol %, from about 0.01 mol % to about 0.6 mol %, from about 0.01 mol % to about 0.5 mol %, from about 0.05 mol % to about 1 mol %, from about 0.1 mol % to about 1 mol %, from about 0.2 mol % to about 1 mol %, from about 0.3 mol % to about 1 mol %, or from about 0.4 mol % to about 1 mol %, and all ranges and sub-ranges therebetween.

The glasses formed from the compositions, as employed in the second phase particles 20 of the antimicrobial article 100, may include a plurality of $Cu^{1+}$ ions. In some embodiments, such $Cu^{1+}$ ions form part of the glass network and may be characterized as a glass modifier. Without being bound by theory, where $Cu^{1+}$ ions are part of the glass network, it is believed that during typical glass formation processes, the cooling step of the molten glass occurs too rapidly to allow crystallization of the copper-containing oxide (e.g., CuO and/or $Cu_2O$). Thus the $Cu^{1+}$ remains in an amorphous state and becomes part of the glass network. In some cases, the total amount of $Cu^{1+}$ ions, whether they are in a crystalline phase or in the glass matrix, may be even higher, such as up to 40 mol %, up to 50 mol %, or up to 60 mol %.

In one or more embodiments, the glasses formed form the compositions disclosed herein, as employed in the second phase particles 20 of the antimicrobial article 100, include $Cu^{1+}$ ions that are dispersed in the glass matrix as $Cu^{1+}$ crystals. In one or more embodiments, the $Cu^{1+}$ crystals may be present in the form of cuprite. The cuprite present in the glass may form a phase that is distinct from the glass matrix or glass phase. In other embodiments, the cuprite may form part of or may be associated with one or more glass phases (e.g., the durable phase described herein). The $Cu^{1+}$ crystals may have an average major dimension of about 5 micrometers (μm) or less, 4 micrometers (μm) or less, 3 micrometers (μm) or less, 2 micrometers (μm) or less, about 1.9 micrometers (μm) or less, about 1.8 micrometers (μm) or less, about 1.7 micrometers (μm) or less, about 1.6 micrometers (μm) or less, about 1.5 micrometers (μm) or less, about 1.4 micrometers (μm) or less, about 1.3 micrometers (μm) or less, about 1.2 micrometers (μm) or less, about 1.1 micrometers or less, 1 micrometers or less, about 0.9 micrometers (μm) or less, about 0.8 micrometers (μm) or less, about 0.7 micrometers (μm) or less, about 0.6 micrometers (μm) or less, about 0.5 micrometers (μm) or less, about 0.4 micrometers (μm) or less, about 0.3 micrometers (μm) or less, about 0.2 micrometers (μm) or less, about 0.1 micrometers (μm) or less, about 0.05 micrometers (μm) or less, and all ranges and sub-ranges therebetween. As used herein and with respect to the phrase "average major dimension," the word "average" refers to a mean value and the word "major dimension" is the greatest dimension of the particle as measured by scanning electron microscopy (SEM). In some embodiments, the cuprite phase may be present in the glass of the second phase particles 20 of the antimicrobial composite article 100 in an amount of at least about 10 wt %, at least about 15 wt %, at least about 20 wt %, at least about 25 wt % and all ranges and subranges therebetween of the antimicrobial glass. In certain implementations, the phase-separable glasses formed from the compositions disclosed herein, as employed in the second phase particles 20 of the antimicrobial article 100, can include 10 to 50 mol % cuprite, and all ranges and subranges therebetween, of the phase-separable glass.

In some embodiments, the glasses as employed in the second phase particles 20 of the antimicrobial article 100 may include about 70 wt % $Cu^{1+}$ or more and about 30 wt % of $Cu^{2+}$ or less. The $Cu^{2+}$ ions may be present in tenorite form and/or even in the glass (i.e., not as a crystalline phase).

In some embodiments, the total amount of Cu by wt % in the glasses as employed in the second phase particles 20 of the antimicrobial article 100 may be in the range from about 10 to about 30, from about 15 to about 25, from about 11 to about 30, from about 12 to about 30, from about 13 to about 30, from about 14 to about 30, from about 15 to about 30, from about 16 to about 30, from about 17 to about 30, from about 18 to about 30, from about 19 to about 30, from about 20 to about 30, from about 10 to about 29, from about 10 to about 28, from about 10 to about 27, from about 10 to about 26, from about 10 to about 25, from about 10 to about 24, from about 10 to about 23, from about 10 to about 22, from about 10 to about 21, from about 10 to about 20, from about 16 to about 24, from about 17 to about 23, from about 18 to about 22, from about 19 to about 21 and all ranges and sub-ranges therebetween. In one or more embodiments, the ratio of $Cu^{1+}$ ions to the total amount Cu in the glass is about 0.5 or greater, 0.55 or greater, 0.6 or greater, 0.65 or greater, 0.7 or greater, 0.75 or greater, 0.8 or greater, 0.85 or greater, 0.9 or greater or even 1 or greater, and all ranges and sub-ranges therebetween. The amount of Cu and the ratio of $Cu^{1+}$ ions to total Cu may be determined by inductively coupled plasma (ICP) techniques known in the art.

In some embodiments, the glass as employed in the second phase particles 20 of the antimicrobial article 100 may exhibit a greater amount of $Cu^{1+}$ and/or CuO than $Cu^{2+}$. For example, based on the total amount of $Cu^{1+}$, $Cu^{2+}$ and CuO in the glasses, the percentage of $Cu^{1+}$ and $Cu^0$, combined, may be in the range from about 50% to about 99.9%, from about 50% to about 99%, from about 50% to about 95%, from about 50% to about 90%, from about 55% to about 99.9%, from about 60% to about 99.9%, from about 65% to about 99.9%, from about 70% to about 99.9%, from about 75% to about 99.9%, from about 80% to about 99.9%, from about 85% to about 99.9%, from about 90% to about 99.9%, from about 95% to about 99.9%, and all ranges and sub-ranges therebetween. The relative amounts of $Cu^{1+}$, $Cu^{2+}$ and $Cu^0$ may be determined using x-ray photoluminescence spectroscopy (XPS) techniques known in the art.

Referring again to FIG. 1, the plurality of second phase particles 20 of the antimicrobial article 100 can employ a phase-separable glass. As depicted in FIG. 2, the phase-separable glass of the second phase particles 20 can comprise at least a first phase 24 and a second phase 22. In one or more embodiments, the phase-separable glass may include two or more phases wherein the phases differ based on the ability of the atomic bonds in the given phase to withstand interaction with a leachate. Specifically, the glass of one or more embodiments may include a first phase 24 that may be described as a degradable phase and a second phase 22 that may be described as a durable phase. The phrases "first phase" and "degradable phase" may be used interchangeably. The phrases "second phase" and "durable phase" may be used interchangeably in the context of the phase-separable glass. As used herein, the term "durable" refers to the tendency of the atomic bonds of the durable phase to remain intact during and after interaction with a leachate. As used herein, the term "degradable" refers to the tendency of the atomic bonds of the degradable phase to break during and after interaction with one or more leachates. In one or more embodiments, the durable phase includes $SiO_2$ and the degradable phase includes at least one of $B_2O_3$, $P_2O_5$ and $R_2O$ (where R can include any one or more of K, Na, Li, Rb, and Cs). Without being bound by theory, it is believed that the components of the degradable phase (i.e., $B_2O_3$, $P_2O_5$ and/or $R_2O$) more readily interact with a leachate and the bonds between these components to one another and to other components in the phase-separable glass more readily break during and after the interaction with the leachate. Leachates may include water, acids or other similar materials. In one or more embodiments, the degradable phase withstands degradation for 1 week or longer, 1 month or longer, 3 months or longer, or even 6 months or longer. In some embodiments, longevity may be characterized as maintaining antimicrobial efficacy over a specific period of time.

In one or more embodiments of the antimicrobial article 100, the durable phase of the phase-separable glass employed in the second phase particles 20 is present in an amount by weight that is greater than the amount of the degradable phase. In some instances, as shown in FIG. 2, the degradable phase 24 of the second phase particles 20 forms islands and the durable phase 22 forms the sea surrounding the islands (i.e., the durable phase). In one or more embodiments, either one or both of the durable phase and the degradable phase may include cuprite 26. The cuprite 26 in such embodiments may be dispersed in the respective phase or in both phases. As shown in FIG. 2, the cuprite 26 is encapsulated within the degradable phase 24 within a surrounding "sea" of the durable phase 22.

In some embodiments of the phase-separable glass, phase separation occurs without any additional heat treatment of the glass. In some embodiments, phase separation may occur during melting and may be present when the glass composition is melted at temperatures up to and including about 1600° C. or 1650° C. When the glass is cooled, the phase separation is maintained (e.g., in a metastable state).

The phase-separable glass, as described in the foregoing, may be provided as a sheet or may have another shape or form such as particulate, fibrous, and the like. Referring to FIG. 1, the phase-separable glass is in the form of second phase particles 20, generally bounded by a matrix 10 that comprises a polymeric material. In the second phase particles 20 within the exposed portion of exterior surface 40, the surface portion of the particles 20 may include a plurality of copper ions wherein at least 75% of the plurality of copper ions includes $Cu^{1+}$ ions. For example, in some instances, at least about 80%, at least about 85%, at least about 90%, at least about 95%, at least about 98%, at least about 99% or at least about 99.9% of the plurality of copper ions in the surface portion includes $Cu^{1+}$ ions. In some embodiments, 25% or less (e.g., 20% or less, 15% or less, 12% or less, 10% or less or 8% or less) of the plurality of copper ions in the surface portion include $Cu^{2+}$ ions. For example, in some instances, 20% or less, 15% or less, 10% or less, 5% or less, 2% or less, 1% or less, 0.5% or less or 0.01% or less of the plurality of copper ions in the surface portion include $Cu^{2+}$ ions. In some embodiments, the surface concentration of $Cu^{1+}$ ions in the antimicrobial glass is controlled. In some instances, a $Cu^{1+}$ ion concentration of about 4 ppm or greater can be provided on the surface of the antimicrobial glass.

Referring again to FIG. 1, the second phase particles 20 of the antimicrobial article 100 in some aspects can include phase-separable glass that includes at least one of $B_2O_3$, $P_2O_5$ and $R_2O$, and the antimicrobial agent is cuprite (e.g., cuprite 26 as depicted in FIG. 2), which includes a plurality of $Cu^{1+}$ ions. In certain aspects, the plurality of second phase particles 20 has a size distribution defined by a 325 standard US mesh size. As understood by those with ordinary skill in the field, the second phase particles 20 can be employed with other size distributions, e.g., as obtained from sieving through one or more sieves having other US mesh sizes.

The bulk element 60 (when present) and the matrix 10 of the antimicrobial composite region 50 of the antimicrobial article 100, in some embodiments, can include a polymeric material. For example, a polypropylene, a polyolefin, a polysulfone, or a blend of these materials, are suitable polymeric materials for the bulk element 60 and/or matrix 10. In certain implementations of the antimicrobial articles 100, particularly those manufactured by mixing the second phase particles 20 within the matrix 10 (e.g., by an extrusion process) to form an antimicrobial composite region 50 in the form of a film, the polymeric material of the bulk element 60 and/or the matrix 10 can be characterized by, or otherwise treated to obtain, substantial hydrophobicity, while the exposed surface portion 40 of the matrix and/or bulk element is characterized by, or otherwise treated to obtain, substantial hydrophilicity. Such configurations, while often adding manufacturing cost, can be advantageous to improve antimicrobial efficacy when the second phase particles 20 are not significantly exposed on the surface portion 40 of the article 100, as fabricated (e.g., when the antimicrobial region 50 is fabricated in the form of a film through an extrusion process). Similarly, other implementations of the antimicrobial article 100 can employ a bulk element 60, a matrix 10 (i.e., of the antimicrobial composite region 50) and an exposed surface portion 40 of the matrix 10 and/or bulk element 60 that include a polymeric material characterized by substantial hydrophilicity. In addition, the exposed surface portion 40 of the article 100 can comprise functional groups derived from a plasma treatment of the matrix 10 and/or the bulk element. Without being bound by theory, it is believed that controlling the hydrophilicity (or hydrophobicity) of the matrix 10 and/or bulk element 60 in the exposed surface portion 40 can improve the antimicrobial efficacy of the article 100, particularly in configurations in which the area fraction of the second phase particles 20 on the surface portion 40 is lower than the volume fraction of the second phase particles within the antimicrobial composite region 50.

Referring again to FIG. 1, the exposed portion of the exterior surface 40 can, at least in some aspects, contain a certain percentage of second phase particles 20 that have been bisected or are otherwise sectioned such that their interiors are exposed. In certain implementations, the exposed portion of the plurality of the second phase particles 20 can be distributed within the exposed portion of the matrix 10 at a second phase area fraction within ±25% of the second phase volume fraction within the antimicrobial composite region 50. That is, the exposed portion of the exterior surface 40 possesses roughly the same or similar percentage of second phase particles as the bulk of the antimicrobial composite region 50.

Referring to FIG. 1A, an antimicrobial article 100a can be configured similarly to the antimicrobial article 100 depicted in FIG. 1, with like-numbered elements having the same or similar structures and functions. As shown in FIG. 1A, the antimicrobial composite region of the antimicrobial article 100a is an antimicrobial composite film 50a that is laminated to the primary surface 62a of the bulk element 60. In this configuration, the bulk element can be devoid of second phase particles 20 that include a phase-separable glass with a copper-containing antimicrobial agent. The matrix 10 of the antimicrobial composite film 50a and the bulk element 60 can be fabricated from the same, or a substantially similar, polymeric material in some embodiments of the antimicrobial article 100a.

In certain implementations of the antimicrobial article 100a, the bulk element 60 can include a second plurality of second phase particles 80 with the same or different mechanical properties as the polymeric material of the bulk element 60. For example, the second plurality of second phase particles 80 can exhibit a higher elastic modulus than the polymeric material of the bulk element 60 and thus serve to reinforce the bulk element 60. As such, second phase particles 80 can be fabricated from various glasses, glass-ceramics, ceramics in the form of particles, particulate, fibers, whiskers, and other forms as understood by those with ordinary skill in the field of the disclosure.

According to a further embodiment of these antimicrobial articles 100a depicted in FIG. 1A, the second phase particles 20 that include a phase-separable glass with a copper-containing antimicrobial agent can be pressed, embossed or otherwise injected into the antimicrobial composite film 50a. In such configurations, the second phase particles 20 are substantially concentrated in proximity to the exposed surface portion 40 (e.g., within about 5 μm of the surface portion 40). An advantage of this configuration is that the exposed surface portion 40 of the antimicrobial composite film 50a can contain the same or a substantially similar area fraction of second phase particles 20 as the volume fraction of the second phase particles within the film 50a. With more second phase particles 20 exposed in the exposed surface portion 40 of the film 50a through pressing, embossing, injecting or the like, additional surface treatments (e.g., plasma treatments) to alter or otherwise enhance the hydrophilicity (or hydrophobicity) of the matrix 10 and/or expose portions of the second phase particles 20 (e.g., through abrading) are not necessary to obtain high antimicrobial efficacy.

Figure 2:
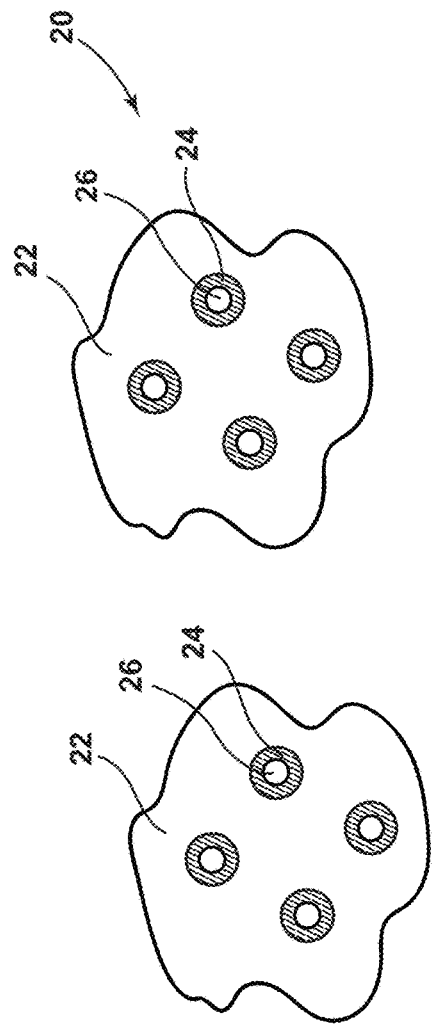
FIG. 2 is a cross-sectional view of second phase particles that include a phase-separable glass and a copper-containing antimicrobial agent according to an embodiment.

Referring to FIG. 1B, an antimicrobial article 100b can be configured similarly to the antimicrobial article 100 depicted in FIG. 1, with like-numbered elements having the same or similar structures and functions. As shown in FIG. 1B, the antimicrobial composite region 50 of the antimicrobial article 100b extends from the primary surface 62b of the bulk element 60 to a first selected depth 64 within the element and the bulk element 60 has a composition that includes a polymeric material. In this configuration, a portion of the bulk element 60 beneath the antimicrobial composite region 50 can be devoid of second phase particles that include a phase-separable glass with a copper-containing antimicrobial agent. According to some embodiments of the article 100b, the second phase particles 20 that include a phase-separable glass with a copper-containing antimicrobial agent can be pressed, embossed or otherwise injected into the bulk element 60 to the first selected depth 64. By pressing the second phase particles 20 into the bulk element 60, the presence of the particles within the depth 64 effectively defines the antimicrobial composite region 50. Accordingly, the antimicrobial article 100*b*, and thus the bulk element 60 and antimicrobial region 50, can be in the form of a film in some embodiments. Further, in many implementations, the matrix 10 in the antimicrobial composite region 50 includes or is otherwise composed of the same materials as the bulk element 60. As such, the matrix 10 can be integral within the bulk element 60. Essentially, the act of pressing the second phase particles 20 into the bulk element 60 creates the antimicrobial composite region 50 and the matrix 10 is the portion of the bulk element 60 surrounding the second phase particles 20.

In certain implementations of the antimicrobial articles 100*b* depicted in FIG. 1B, the bulk element 60 (e.g., beneath the antimicrobial composite region 50) can include a second plurality of second phase particles 80 with the same or different mechanical properties as the polymeric material of the bulk element 60. As noted earlier in connection with the antimicrobial article 100*a* depicted in FIG. 1A, the second plurality of second phase particles 80 employed within the articles 100*b* in some embodiments can exhibit a higher elastic modulus than the polymeric material of the bulk element 60. For instance, the second plurality of second phase particles 80 can exhibit a higher elastic modulus than the polymeric material of the bulk element 60 and thus serve to reinforce the bulk element 60.

According to some embodiments of the antimicrobial articles 100*a* in which the antimicrobial composite region 50 is a film 50*a* laminated to the primary surface 62*a* of the bulk element 60 (see FIG. 1A), an exposed surface portion 40 of the film 50*a* is configured as a high touch surface of a cover screen for a display device, a housing for a display device, a counter-top, a table-top, a door knob, a rail, an elevator control panel or another comparable device or element with a high touch surface. In other embodiments of the antimicrobial articles 100*b* in which the antimicrobial composite region 50 extends from the primary surface 62*b* of the bulk element to a first selected depth 64 (see FIG. 1), the primary surface of the bulk element (i.e., an exposed surface portion 40 of the antimicrobial composite region 50) can likewise be configured as a high touch surface of a cover screen for a display device, a housing for a display device, a counter-top, a table-top, a door knob, a rail, an elevator control panel or another comparable device or element with a high touch surface. More generally, an exposed surface portion 40 of the antimicrobial composite region 50 of the antimicrobial article 100 depicted in FIG. 1 can also be configured as a high touch surface of any of the foregoing devices, elements, and components.

The antimicrobial articles 100, 100*a* and 100*b* depicted in FIGS. 1, 1A and 1B according to one or more embodiments, and particularly the exposed surface portions 40, may exhibit a 2 log reduction or greater (e.g., 2.5, 3, 3.5, 4, 4.5, 5, 5.5, 6, 6.5 and all ranges and sub-ranges therebetween) in a concentration of at least one of *Staphylococcus aureus, Enterobacter aerogenes, Pseudomonas aeruginosa*, methicillin-resistant *Staphylococcus aureus* (MRSA), and *E. coli* bacteria under modified United States Environmental Protection Agency "Test Method for Efficacy of Copper Alloy Surfaces as a Sanitizer" testing conditions, wherein the modified conditions include substitution of the antimicrobial composite article with the copper-containing surface prescribed in the Method and use of copper metal article as the prescribed control sample in the Method (collectively, the "Modified EPA Copper Test Protocol"). As such, the United States Environmental Protection Agency "Test Method for Efficacy of Copper Alloy Surfaces as a Sanitizer" is hereby incorporated by reference in its entirety within the disclosure. In some instances, the antimicrobial articles 100, 100*a* and 100*b* exhibit at least a 4 log reduction, a 5 log reduction or even a 6 log reduction in the concentration of at least one of *Staphylococcus aureus, Enterobacter aerogenes, Pseudomonas aeruginosa* bacteria, MRSA, and *E. coli* under the Modified EPA Copper Test Protocol.

The antimicrobial articles 100, 100*a* and 100*b* according to one or more embodiments may exhibit the log reductions described herein for long periods of time. In other words, these antimicrobial articles may exhibit extended or prolonged antimicrobial efficacy. For example, in some embodiments, the antimicrobial articles 100, 100*a* and 100*b* may exhibit the log reductions described herein under the Modified EPA Copper Test Protocol for a week, two weeks, three weeks, up to 1 month, up to 3 months, up to 6 months or up to 12 months after the antimicrobial article is formed. These time periods may start at or after the antimicrobial region 50 or film 50*a* is formed or otherwise combined with a bulk element 60.

According to one or more embodiments, the phase-separable glass of the second phase particle 20 may exhibit a preservative function within the antimicrobial region 50 or film 50*a*, when combined with the matrix 10 described herein. In such embodiments, the phase-separable glass may kill or eliminate, or reduce the growth of various foulants in the matrix 10 within the region 50 or film 50*a*. Foulants include fungi, bacteria, viruses and combinations thereof.

According to one or more embodiments, the antimicrobial articles 100, 100*a* and 100*b* containing the phase-separable glasses described herein leach copper ions when exposed or in contact with a leachate. In one or more embodiments, the glass leaches only copper ions when exposed to leachates including water.

In one or more embodiments, the antimicrobial articles 100, 100*a* and 100*b* described herein may have a tunable antimicrobial activity release. The antimicrobial activity of the phase-separable glass may be caused by contact between the second phase particles 20 containing the glass and a leachate, such as water, where the leachate causes $Cu^{1+}$ ions to be released from the glass. This action may be described as water solubility and the water solubility can be tuned to control the release of the $Cu^{1+}$ ions.

In some embodiments, where the $Cu^{1+}$ ions are disposed in the glass network and/or form atomic bonds with the atoms in the glass network of the phase-separable glass, water or humidity breaks those bonds and the $Cu^{1+}$ ions are available for release and may be exposed on the second phase particles 20.

In one or more embodiments of the antimicrobial articles 100, 100*a* and 100*b*, the phase-separable glass of the second phase particles 20 may be formed using low cost melting tanks that are typically used for melting glass compositions such as soda lime silicate. Such phase-separable glass may be formed into a sheet or directly into a particulate using forming processes known in the art. For instance, example forming methods include float glass processes and down-draw processes such as fusion draw and slot draw. When the phase-separable glass is formed into a sheet, it is subsequently ground or otherwise processed (e.g., sieved) to form the second phase particles 20 employed in the antimicrobial articles 100.

As noted earlier, the phase-separable glass can be ground to a powder or particulate form to serve as the second phase particles 20 employed in the matrix 10 of the antimicrobial composite region 50 or film 50a of the antimicrobial articles 100, 100a and 100b. The combination of the phase-separable glass and the matrix material (e.g., a polymeric material serving as matrix 10) may be suitable for injection molding, extrusion or coatings. Such other materials or matrix materials may include polymers, monomers, binders, solvents, or a combination thereof as described herein. The polymer used in the embodiments described herein can include a thermoplastic polymer (e.g., a polyolefin), a cured polymer (e.g., an ultraviolet- or UV-cured polymer, thermosetting polymer, thermosetting coating, etc.), a polymer emulsion, a solvent-based polymer, and combinations thereof. Examples of suitable polymers include, without limitation: thermoplastics including polysulfone (PU), polystyrene (PS), high impact PS, polycarbonate (PC), nylon (sometimes referred to as polyamide (PA)), poly(acrylonitrile-butadiene-styrene) (ABS), PC-ABS blends, polybutyleneterephthlate (PBT) and PBT co-polymers, polyethyleneterephthalate (PET) and PET co-polymers, polyolefins (PO) including polyethylenes (PE), polypropylenes (PP), cyclicpolyolefins (cyclic-PO), modified polyphenylene oxide (mPPO), polyvinylchloride (PVC), acrylic polymers including polymethyl methacrylate (PMMA), thermoplastic elastomers (TPE), thermoplastic urethanes (TPU), polyetherimide (PEI) and blends of these polymers with each other. Suitable injection moldable thermosetting polymers include epoxy, acrylic, styrenic, phenolic, melamine, urethanes, polyesters and silicone resins. In certain aspects, the matrix material serving as matrix 10 can comprise a low (e.g., a polyolefin) or a high (e.g., polyethyleneimine) melting point polymeric material. The matrix 10 may also comprise a low or high molecular weight polymeric material. The matrix material can also comprise a bulk polymeric material (e.g., pure polyolefin), a blend of polymeric materials (e.g., a polyethylene/polypropylene mixture) and/or a composite polymeric material (e.g., a polyolefin/glass composite in which the glass is particulate form as a second plurality of second phase particles 80). Similarly, the matrix material can be the same or different than the material employed in the bulk element 60. Other suitable polymeric variants include linear, ladder and branched polymers (e.g., star polymers, brush polymers and dendrons/dentrimers). Another polymeric material variant that can be employed for the matrix 10 and/or bulk element 60 includes copolymers (e.g., linear, branched and cyclo/ring).

In other embodiments, the polymers may be dissolved in a solvent or dispersed as a separate phase in a solvent and form a polymer emulsion, such as a latex (which is a water emulsion of a synthetic or natural rubber, or plastic obtained by polymerization and used especially in coatings (as paint) and adhesives. Polymers may include fluorinated silanes or other low friction or anti-frictive materials. The polymers can contain impact modifiers, flame retardants, UV inhibitors, antistatic agents, mold release agents, fillers including glass, metal or carbon fibers or particles (including spheres), talc, clay or mica and colorants. Specific examples of monomers include catalyst curable monomers, thermally-curable monomers, radiation-curable monomers and combinations thereof.

In one or more embodiments of the antimicrobial articles 100, 100a and 100b depicted in FIGS. 1, 1A and 1i, the phase-separable glass may be provided in particulate form as second phase particles 20. In this form, the phase-separable glass may have a diameter in the range from about 0.1 micrometers (μm) to about 10 micrometers, from about 0.1 micrometers to about 9 micrometers, from about 0.1 micrometers to about 8 micrometers, from about 0.1 micrometers to about 7 micrometers, from about 0.1 micrometers to about 6 micrometers, from about 0.5 micrometers to about 10 micrometers, from about 0.75 micrometers to about 10 micrometers, from about 1 micrometers to about 10 micrometers, from about 2 micrometers to about 10 micrometers, from about 3 micrometers to about 10 micrometers from about 3 micrometers to about 6 micrometers, from about 3.5 micrometers to about 5.5 micrometers, from about 4 micrometers, to about 5 micrometers, and all ranges and sub-ranges therebetween. The glass may be substantially spherical or may have an irregular shape.

Without being bound by theory, it is believed that the combination of the phase-separable glass described herein (e.g., within second phase particles 20) and a matrix (e.g., matrix 10), such as a polypropylene or polysulfone material, provides substantially greater antimicrobial efficacy as compared to the same matrix materials that includes only $Cu_2O$ (cuprite), even when the same amount of copper is utilized. The presence of $Cu^{1+}$ crystals in the phase-separable glasses described herein, even when present as cuprite, tends to remain in the $Cu^{1+}$ state. Without being bound by theory, it is believed that when $Cu_2O$ is provided alone, separate from the phase-separable glasses described herein, the Cu ions are less stable and may change to $Cu^{2+}$ from $Cu^{1+}$.

The antimicrobial performance of the antimicrobial articles 100, 100a and 100b described herein can be influenced by the presence and thickness a thin layer of the matrix 10 coincident with or over the second phase particles 20 on the exterior surface 40 (see FIGS. 1, 1A and 1i). Depending on the composition of the matrix 10 and its process history, this thin layer may exhibit hydrophobic or substantially hydrophobic properties and may block the active copper species ($Cu^{1+}$) from exposure to air or from leaching to the exterior surface 40. For example, a matrix 10 comprising a polymeric material that is hydrophobic or substantially hydrophobic (e.g., a polyolefin) can include such a thin layer coincident with or over the second phase particles 20. In one or more embodiments, the articles 100, 100a and 100b may also use polymers as the matrix 10 that have balanced hydrophobic-hydrophilic properties that facilitate leaching of the active copper species. Examples of such polymers include hygroscopic/water soluble polymers and surfactants, amphiphilic polymers (e.g., poly(vinyl alcohol-co-ethylene)) and/or a combination of amphiphilic polymers and hygroscopic materials. In other implementations, the matrix 10 may comprise a polymeric material with substantially hydrophilic properties (e.g., poly(vinyl alcohol)).

In one or more embodiments, the exposure to air and/or leaching of the active copper species to the surface may be facilitated by configuring the articles 100, 100a and 100b such their exterior surfaces 40 (and, in some cases, the exterior surfaces 30 depicted in FIGS. 1, 1A and 1B) with an "exposed portion." In some embodiments, such an "exposed portion" is a portion of an exterior surfaces 30, 40 of the antimicrobial articles 100 and 100a and, more particularly the antimicrobial composite region 50 or film 50a (see FIGS. 1 and 1A), that has been mechanically and/or chemically treated to expose at least some of the second phase particles 20 containing the phase-separable glass contained in the article 100 (and surrounded by matrix 10) to the air or to provide some portion of the phase-separable glass at the exterior surfaces 30, 40 of the article. Specific methods for providing an exposed portion of an exterior surface include sanding, polishing, plasma treating (e.g., air, $N_2$, $O_2$, $H_2$, $N_2$ and/or Argon based plasma) and other methods that will remove a thin layer of the matrix 10 (e.g., a polymeric material). In one or more alternative embodiments, the exposed portion of the exterior surfaces 30, 40 includes functional groups, particularly hydroxyl and carbonyl groups, which are introduced into or to the exposed treated surface, to make such surface more hydrophilic. By providing an exposed portion of an exterior surface 30, 40, the active copper species is exposed to air or more readily leaches the surface of the articles 100 and 100*a*.

In other embodiments, such an "exposed portion" is a portion of the exterior surfaces 30, 40 of the antimicrobial article 100*b* that includes exposed second phase particles 20 within the antimicrobial composite region 50. In particular, this exposed portion of the surfaces 30, 40 can be created by virtue of pressing, embossing, injecting or another similar process to place the second phase particles 20 into the antimicrobial composite region 50 to a selected depth 64. As such, many of the second phase particles 20 will remain exposed or substantially exposed to the air upon placement in the antimicrobial composite region 50.

To improve processing (e.g., through control of melt viscosity), mechanical properties and interactions between the matrix 10 (e.g., a polymeric material) and the second phase particles 20 (e.g., phase-separable glass) described herein (including any fillers and/or additives that may be used), processing agents/aids can be included in the antimicrobial articles 100, 100*a* and 100*b* described herein. Exemplary processing agents/aids can include solid or liquid materials. The processing agents/aids may provide various extrusion benefits, and may include silicone based oil, wax and free flowing fluoropolymer. In other embodiments, the processing agents/aids may include compatibilizers/coupling agents, e.g., organosilicon compounds such as organosilanes/siloxanes that are typically used in processing of polymer composites for improving mechanical and thermal properties. Such compatibilizers/coupling agents can be used to surface modify the glass and can include (3-acryloxy-propyl)trimethoxysilane; N-(2-aminoethyl)-3-aminopropyltrimethoxysilane; 3-aminopropyltri-ethoxysilane; 3-aminopropyltrimethoxysilane; (3-glycidoxypropyl)trimethoxysilane; 3-mercapto-propyltrimethoxysilane; 3-methacryloxypropyltrimethoxysilane; and vinyltrimethoxysilane. In some embodiments of the antimicrobial articles in the disclosure, the total volume fraction of processing agents (e.g., as including processing aids, compatibilizers and/or coupling agents) can range from about 0.1% to about 5%, or from about 0.5% to about 2% of the antimicrobial composite region 50.

In some embodiments, the antimicrobial articles 100, 100*a* and 100*b* described herein may also incorporate fillers and pigments, including metal-based inorganics, for color and other purposes. For example, these fillers can include aluminum pigments, copper pigments, cobalt pigments, manganese pigments, iron pigments, titanium pigments, tin pigments, clay earth pigments (naturally formed iron oxides), carbon pigments, antimony pigments, barium pigments, and zinc pigments.

After combining the phase-separable glass described herein with a matrix 10 to form an antimicrobial composite region 50 or film 50*a*, as described herein, along with a bulk element 60, the combination may be formed into a desired antimicrobial article 100, 100*a* and 100*b*. Examples of such antimicrobial articles include housings for electronic devices (e.g., mobile phones, smart phones, tablets, video players, information terminal devices, laptop computer, etc.), architectural structures (e.g., countertops or walls), appliances (e.g., cooktops, refrigerator and dishwasher doors, etc.), information displays (e.g., whiteboards), and automotive components (e.g., dashboard panels, windshields, window components, etc.).

In one or more embodiments, the articles 100, 100*a* and 100*b* may be configured with controlled porosity levels and be made into different shapes, including complex shapes and in different forms including plastics, rubbers and fiber/fabrics, which can have the same or different applications. In some embodiments, porous articles 100, 100*a* and 100*b* can be used as antimicrobial filters. For example, the antimicrobial composite film 50*a* may be extruded into a honeycomb structure, which not only includes channels but also porous channel walls. In another example, an antimicrobial composite film 50*a* could be laminated to a bulk element 60, already containing a controlled amount of porosity. Also, it is possible to fabricate an antimicrobial article 100*b* with an antimicrobial region 50 having pressed or embossed second phase particles 20 with a bulk element 60 containing fugitive materials (e.g., carbonaceous materials) that can be subsequently processed to obtain desired levels of porosity in the bulk element 60.

Cu(I) is an excellent catalyst for organic reactions, particularly for mild organic reactions, such as polymerization of acrylic monomers and oleochemical applications (e.g., hydrogenolysis of fatty esters to fatty alcohols including both methyl ester and wax ester processes, alkylation of alcohols with amines and amination of fatty alcohols), just to name a few. Accordingly, the antimicrobial articles 100, 100*a* and 100*b* described herein may be used for such catalyst-oriented applications, even if not employed in an application that utilizes their inherent antimicrobial properties.

Figure 3:
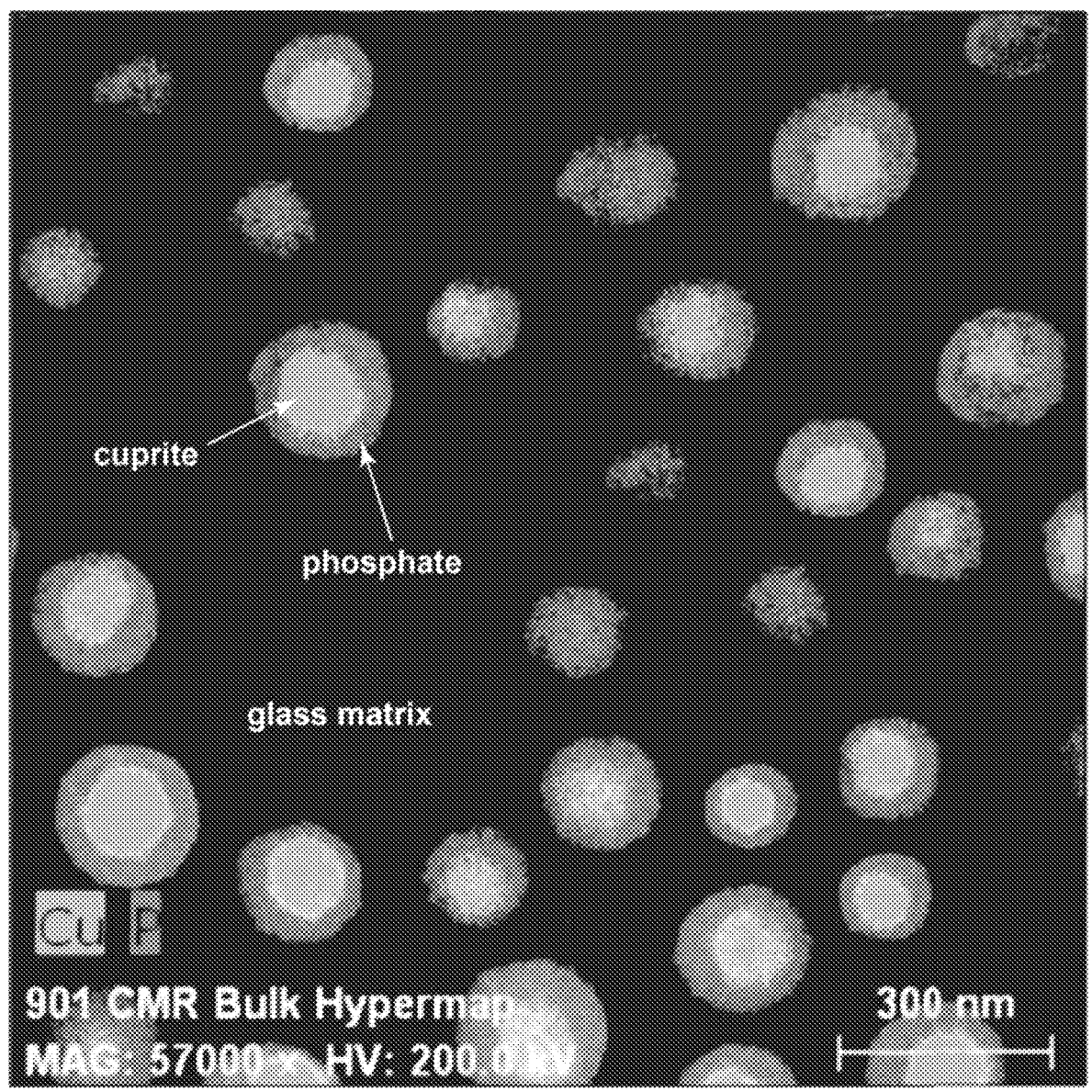
FIG. 3 is an energy dispersive spectroscopy (EDS) image of phase-separable glass that can be employed within an antimicrobial article of the disclosure.

Referring to FIG. 3, an energy dispersive spectroscopy (EDS) image of the phase-separable glass outlined in the disclosure that can be employed in an antimicrobial article (e.g., articles 100, 100*a* and 100*b*) is provided. More specifically, the phase-separable glass in the EDS image in FIG. 3 is exemplary of the second phase particles 20 in an exposed surface portion 40 (see FIGS. 1, 1A and 1B). In FIG. 3, the phase-separable glass was prepared according to U.S. patent application Ser. No. 14/623,077, filed on Feb. 16, 2015 and published as U.S. Patent Publication No. 2015/0230476 on Aug. 20, 2015, the salient portions of which related to phase-separable glass processing are hereby incorporated by reference within this disclosure. In FIG. 3, the glass depicted in the EDS image is a phase-separable phosphate glass that contains cuprite crystals (~35 mol % cuprite) with a particle size of 100 to 250 nm in the discontinuous, low durability phase (i.e., the phosphate phase) and possesses a high antimicrobial efficacy. In addition, the phase-separable phosphate glass comprises carbon black concentrate for color (i.e., Clariant Corporation SL94620036 carbon black). Further, the phase-separable glass depicted in FIG. 3 can be jet milled to a powder form and sieved (e.g., with a 325 mesh) to form a particulate for use as second phase particles 20 in an antimicrobial article 100, 100a and 100b. The particulate can then be compounded with a matrix polymer (e.g., serving as matrix 10) to obtain the final antimicrobial article form.

According to a second principal implementation, a method of making an antimicrobial article (e.g., article 100a depicted in FIG. 1A) is provided. The method includes the steps: mixing second phase particles 20 that include a phase-separable glass with a copper-containing antimicrobial agent with a matrix precursor that includes polymeric particles to define an antimicrobial mix; and forming the antimicrobial mix into an antimicrobial composite film 50s that includes a matrix 10 and a first plurality of the second phase particles 20 within the matrix 10 at a second phase volume fraction. The method also includes a step of affixing the antimicrobial composite film 50a to a primary surface 62a of a bulk element 60. The step of affixing the antimicrobial film 50a can be conducted through lamination, hot pressing and other methods understood by those with ordinary skill in the art, e.g., processes that are typically employed to attach a polymeric film to a polymeric bulk material.

Other embodiments of the method in the second implementation further include a step of melting the matrix precursor of the antimicrobial mix to provide a dispersion of the second phase particles 20, and the polymeric particles are polymeric particles that can be melted (e.g., thermoplastic materials). In an additional embodiment, the forming step includes extruding the antimicrobial mix into the antimicrobial composite film 50a, and the polymeric particles are, accordingly, polymeric particles that be melted or otherwise extruded (e.g., thermoplastic materials).

In another embodiment of the second implementation, the forming step can be conducted according to predetermined temperature(s) and time(s) that are based on the compatibility of particles (e.g., second phase particles that include a phase-separable glass with a copper-containing antimicrobial agent) and a matrix precursor (e.g., a precursor that includes polymeric particles). As used herein, "compatibility" between the matrix precursor and particles employed in the forming step relates to a temperature and time treatment during the forming step in which no more than a particular weight percentage of the matrix precursor is lost during the forming step. In some embodiments, the compatibility can be set based on an upper limit of 10% loss by weight, 9% loss by weight, 8% loss by weight, 7% loss by weight, 6% loss by weight, 5% loss by weight, 4% loss by weight, 3% loss by weight, 1% loss by weight, 0.5% loss by weight and other percentages between these limits. In one or more embodiments, the compatibility is set to a loss of 5% or less by weight. As such, the predetermined temperature(s) and time(s) can be ascertained for a given combination of matrix precursor and particles through thermogravimetric testing ("TGA") of the combination. As understood by those with ordinary skill in the field of this disclosure, a TGA plot can be used to assess temperature and time as a function of weight loss to develop predetermined temperature(s) and time(s) for the forming step to ensure compatibility. Without being bound by theory, the temperature(s) and time(s) in which appreciable weight loss for a matrix precursor (e.g., polypropylene particles) can change in the presence of fillers, particularly fillers in the form of glass particles. In some cases, appreciable weight loss of the matrix precursor with fillers in the form of glass particles can occur at significantly lower temperatures (e.g., during an extrusion process) than would otherwise occur with no fillers. As such, embodiments of the second implementation can include a forming step that includes a consideration of the compatibility of the matrix precursor and particles. In some aspects, these considerations can include conducting the forming step according to a predetermined temperature and time treatment in view of prior-obtained TGA compatibility data for the combination of the matrix precursor and particles. In other aspects, these considerations can include selecting the combination of matrix precursor and particles with a particular compatibility (e.g., no more than 5% loss of matrix precursor by weight) at a given forming temperature and time (e.g., an upper extrusion temperature of 300° C.).

According to another embodiment of the second principal implementation, the method can further include a treating step after the forming step. In particular, the treating step can include abrading the antimicrobial composite film 50a to define or otherwise reveal an exposed portion 40 of the matrix 10 and the plurality of second phase particles 20. The abrading can be conducted with hand sanding, grit blasting or other similar grinding and/or polishing techniques. In other aspects of the method, the treating step can include abrading and plasma-treating the antimicrobial composite film 50a to define or otherwise reveal an exposed portion 40 of the matrix 10 and the plurality of second phase particles 20. In these implementations, the abrading can be performed before the plasma-treating or vice versa. Further, the plasma-treating can be conducted with any of a variety of known processes that produce or otherwise create functional groups in the exposed portion 40 of the matrix 10.

According to a third principal implementation, a method of making an antimicrobial article (e.g., article 100b depicted in FIG. 1B) is provided. The method includes the steps: forming a bulk element 60 having a primary surface 62b that includes a polymeric material; and pressing second phase particles 20 that include a phase-separable glass with a copper-containing antimicrobial agent into the primary surface 62b of the bulk element 60 to define an antimicrobial composite region 50. The antimicrobial composite region 50 includes: (a) a matrix 10 comprising a polymeric material; and (b) a first plurality of the second phase particles 20 within the matrix 10 at a second phase volume fraction. Further, in some embodiments, the pressing step can be conducted by various techniques understood by those with ordinary skill in the field that include embossing, hot pressing and/or rolling. More generally, the bulk element 60 is heated before the action of pressing the second phase particles 20 into the element 60 occurs. Upon cooling, the second phase particles 20 become set within the bulk element 60. More particularly, the second phase particles 20 are incorporated into the matrix 10 of the antimicrobial composite region 50 during the pressing step.

In another embodiment of the third principal implementation, the bulk element 60 is or otherwise serves as a film (e.g., comparable to film 50a depicted in FIG. 1A), the pressing step includes embossing the second phase particles 20 into the primary surface 62b of the bulk element 60, and the antimicrobial composite region 50 is an antimicrobial composite film. In some aspects of this embodiment, the method further includes a step of affixing the antimicrobial composite film (e.g., as embossed with second phase particles 20) to a primary surface of a second bulk element (not shown). In other embodiments, the pressing step includes embossing the second phase particles 20 into the primary surface 62b of the bulk element 60 to define the antimicrobial composite region (e.g., an antimicrobial composite region 50 as depicted in FIG. 1), and the antimicrobial composite region extends from the primary surface of the bulk element to a first selected depth.

In one implementation of the foregoing embodiment, second phase particles 20 comprising phase-separable glass with a copper-containing antimicrobial agent are collected in a vibrating feeder (e.g., an Eriez Manufacturing Co. vibratory feeder) located above a heated bulk element 60 in the form of a polycarbonate film. The second phase particles are then dispensed at a feed rate between 10 and 30%, or about 20%, onto the bulk element 60 in the form of a film as it exits from a heated die. The bulk element 60 in the form of a film, now containing second phase particles 20 on one of its surfaces, is then routed through heated rolls (e.g., at 140° C.) to press the particles into the bulk element 60. As understood by those with ordinary skill in the field, the foregoing arrangement and process is exemplary and various modifications can be effected to introduce and otherwise press the second phase particles 20 into the bulk element 60.

EXAMPLES

Example 1

Figure 4A:
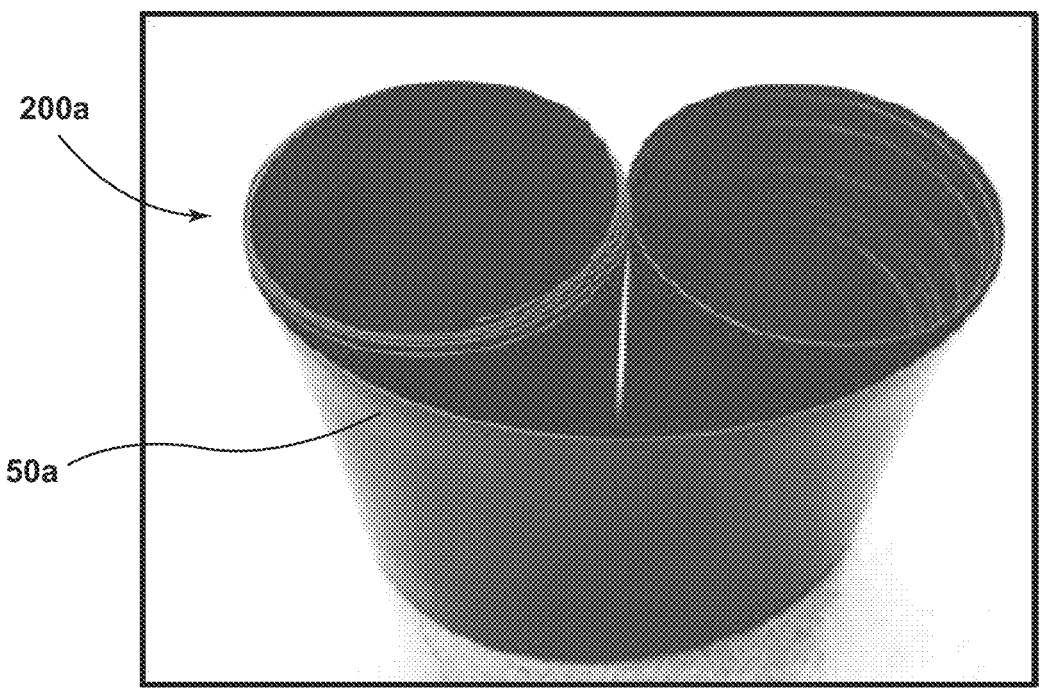
FIGS. 4A & 4B are photographs of antimicrobial composite films that can be employed within an antimicrobial article of the disclosure.
Figure 4B:
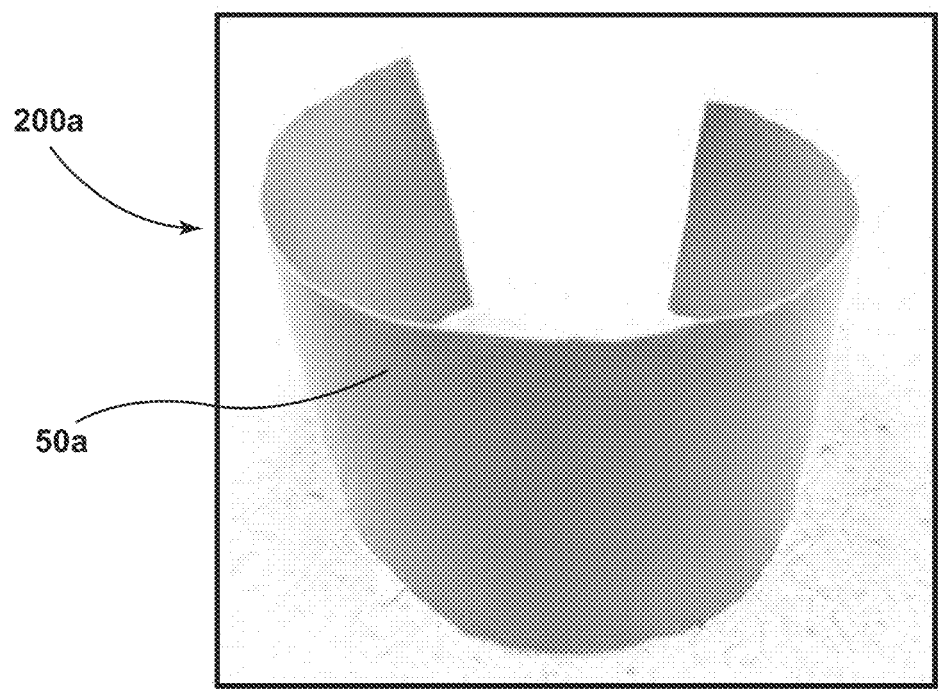

Various polymers were employed as matrix materials to make antimicrobial composite films through an extrusion process. These films are comparable to the antimicrobial composite films 50a employed in the antimicrobial articles 100a depicted in FIG. 1A. Tables 1 and 2 below summarize the materials and process conditions employed to make these films. Prior to each run listed in Table 2, the particular polymer (e.g., Polymer 1) was hand-mixed with the copper, phase-separable glass in a bag before being placed into an extruder. Next, the mix of polymer and copper glass particles was placed into the extruder and the extruder was employed to extrude the antimicrobial composite films. In this example, a Leistritz AG MIC18-7R GL twin-screw extruder (2.5 cm) was employed to make the films according to the conditions outlined in Table 2. The resulting product from the extruder was directed through a 5 cm wide film and a set of roller/winding elements to form each of the films. As shown in FIG. 4A, "Run 3" in Table 2 produced a polypropylene/copper glass antimicrobial film colored with carbon black. As shown in FIG. 4B, "Run 2" in Table 2 produce a polypropylene/copper glass antimicrobial film with no additional colorant, generally exhibiting an orange hue indicative exemplary of the copper glass second phase particles.

TABLE 1

| Material | Description |
| --- | --- |
| Polymer 1 (matrix material) | Trinseo S.A. Calbre ™ 201-15 polycarbonate |
| Polymer 2 (matrix material) | LyondellBasell Industries Holdings, B.V. Prof-fax SA861 polypropylene |
| Polymer 3 (matrix material) | A. Schulman Inc. 510-5085 powder polypropylene |
| Carbon black concentration (filler) | Clariant Corporation SL94620036 |
| Phase-separable glass | Corning ® Inc. copper glass powder (325 mesh) containing 20 mol % cuprite (see FIG. 3) |

TABLE 2

|  | Run 1 | Run 2 | Run 3 | Run 4 | Run 5 |
| --- | --- | --- | --- | --- | --- |
|  |  |  | Material |  |  |
|  | Polymer 1 & 40% Cu-Glass | Polymer 2 & 40% Cu-Glass | Polymer 2 & 40% Cu-Glass & 10% Carbon Black | Polymer 3 & 40% Cu-Glass | Glass-filled Polymer 3 & 40% Cu-Glass |
| Extruder Speed (RPM) | 750 | 700 | 700 | 700 | 700 |
| Front Winder Speed (RPM) | 20 | 20 | 20 | 20 | 20 |
| Back Winder Speed (RPM) | 20 | 20 | 20 | 20 | 20 |
| Melt Pressure (PSI) | 400 | 200 | 200 | 200 | 200 |
| Zone 1 (° C.) | 230 | 210 | 210 | 210 | 210 |
| Zone 2 (° C.) | 245 | 220 | 220 | 220 | 220 |
| Zone 3 (° C.) | 255 | 225 | 225 | 225 | 225 |
| Zone 4 (° C.) | 270 | 230 | 230 | 230 | 230 |
| Bell (° C.) | 285 | 235 | 235 | 235 | 235 |
| 90 Connector (° C.) | 290 | 240 | 240 | 240 | 240 |
| Die (° C.) | 290 | 240 | 240 | 240 | 240 |
| Air Cooling Pressure (PSI) | N/A | N/A | N/A | N/A | N/A |

Example 2

In this example, a polycarbonate film was prepared according to the conditions of "Run 1" in Table 2 and as outlined in Example 1 above (without the phase-separable glass). Once the polycarbonate film was extruded through a die at about 290° C., it was rolled at 140° C. into a final thickness and embossed with the copper glass as outlined above in Table 1.

Example 3

Figure 5:
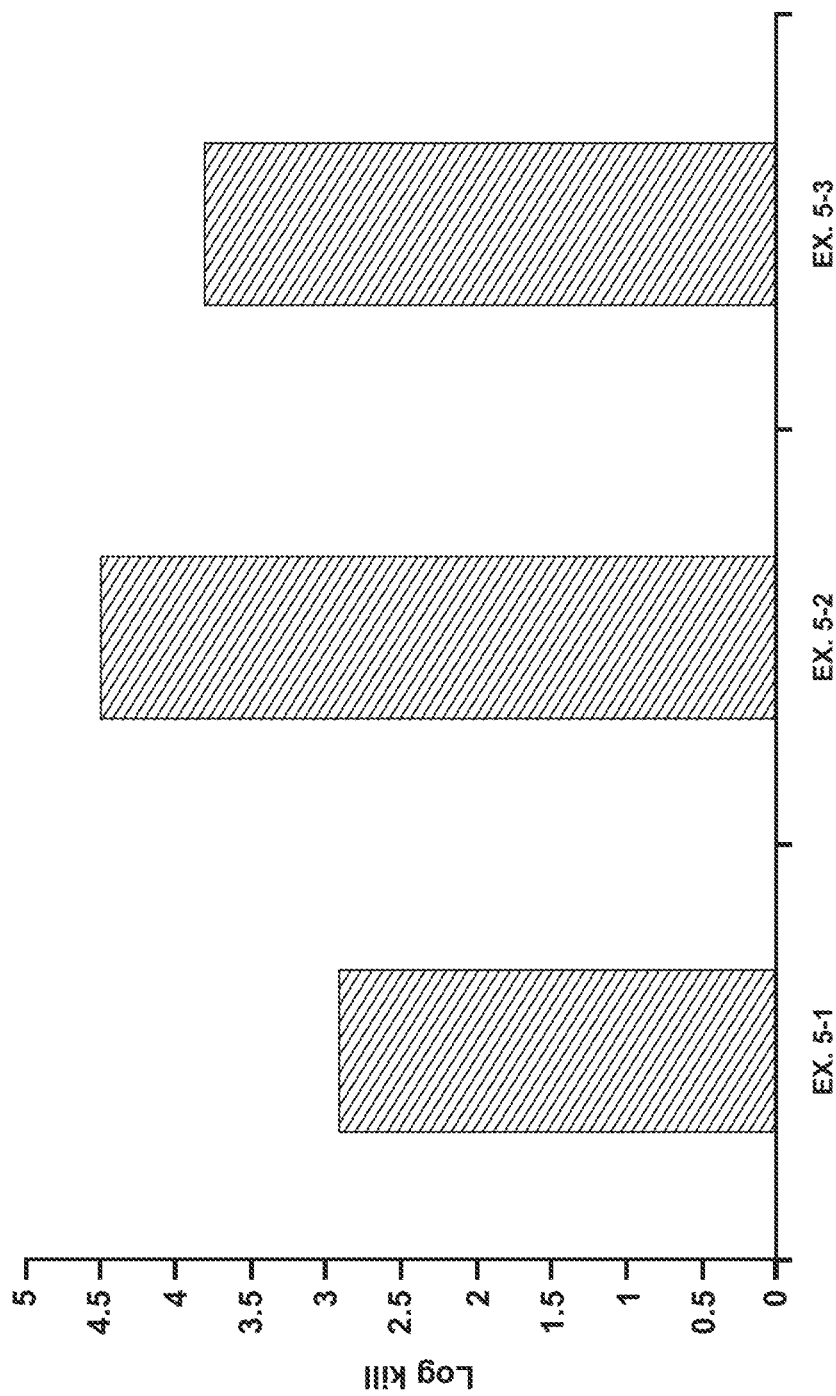
FIG. 5 is a bar chart depicting the antimicrobial efficacy of antimicrobial articles according to implementations of the disclosure.

Referring to FIG. 5, a bar chart depicts the antimicrobial efficacy (as tested with the Modified EPA Copper Test Protocol) of antimicrobial composite films from the above Examples 1 and 2. In particular, "Ex. 5-1" corresponds to "Run 1" from Example 2, i.e., a polycarbonate film embossed with copper glass. "Ex. 5-2" corresponds to "Run 2" from Example 1, i.e., a polypropylene/copper glass composite film in which the polypropylene and copper glass were co-extruded. Finally, "Ex. 5-3" corresponds to "Run 3" from Example 1, i.e., a polypropylene/copper glass/carbon black composite film in which the polypropylene, copper glass and carbon black were co-extruded into the final film.

More specifically, co-extruded and embossed polymer/copper glass composite film samples designated Exs. 5-1, 5-2 and 5-3 were subjected to antimicrobial ("AM") testing with the Modified EPA Copper Test Protocol according to the following parameters and conditions. Each sample subjected to AM testing was cut into a 2.54 cm×2.54 cm coupon. As part of the Protocol, *Staphylococcus aureus* (ATCC 6538) or *Pseudomonas aeruginosa* (ATCC 15442) were cultured for 5 consecutive days before testing. The bacterial culture was mixed with serum (5% final concentration) and Triton-X-100 (final concentration 0.01%). Each of the samples (mounted on a carrier) was inoculated with 20 µl of the bacterial suspension and allowed to dry for approximately 20 to 40 minutes at room temperature and 42% relative humidity. After 2 hours of exposure, the bacteria on each of the samples was washed from the carrier using neutralizer buffer and plated onto tryptic soy agar plates. Each of the plates containing the bacteria (i.e., as corresponding to one of the samples, Ex. 5-1, 5-2 or 5-3) was then subjected to 24 hours of incubation at 37° C. The resultant bacteria colony was then examined for each sample and counted. As understood by those with ordinary skill in the field, calculations were performed to determine geometric mean and percent reductions (relative to a control) based on the bacterial counts from each colony to determine log kill numbers corresponding to each sample. These results were then reported in the bar chart in FIG. 5. As demonstrated by FIG. 5, the various processing approaches produce antimicrobial composite films having comparable efficacy levels characterized by a log kill between about 3 and 4.5.

Aspect (1) of this disclosure pertains to an antimicrobial article, comprising: an antimicrobial composite region that comprises: a matrix comprising a polymeric material, and a first plurality of particles within the matrix that comprise a phase-separable glass with a copper-containing antimicrobial agent.

Aspect (2) of this disclosure pertains to the article of Aspect (1), wherein the antimicrobial composite region is an antimicrobial composite film laminated to the primary surface of a bulk element.

Aspect (3) of this disclosure pertains to the article of Aspect (2), wherein the bulk element comprises a polymeric material.

Aspect (4) of this disclosure pertains to the article of Aspect (3), wherein the bulk element further comprises a second plurality of particles characterized by an elastic modulus greater than the elastic modulus of the polymeric material of the bulk element.

Aspect (5) of this disclosure pertains to the article of Aspect (2), wherein the first plurality of particles is pressed into the film.

Aspect (6) of this disclosure pertains to the article of any one of Aspects (1) through (5), wherein the antimicrobial composite region extends from the primary surface of a bulk element to a first selected depth, and the bulk element comprises a polymeric material.

Aspect (7) of this disclosure pertains to the article of Aspect (6), wherein the bulk element further comprises a second plurality of particles characterized by an elastic modulus different than the elastic modulus of the polymeric material of the bulk element.

Aspect (8) of this disclosure pertains to the article of Aspect (6), wherein the first plurality of particles is pressed into the primary surface of the bulk element.

Aspect (9) of this disclosure pertains to the article of Aspect (8), wherein the bulk element is in the form of a film.

Aspect (10) of this disclosure pertains to the article of Aspect (9), wherein the matrix material and the first plurality of particles are collectively characterized by compatibility in which no more than 5% of the matrix material by weight is lost during a co-extrusion of the antimicrobial article at a temperature of less than 300° C.

Aspect (11) of this disclosure pertains to the article of any one of Aspects (1) through (10), wherein the phase-separable glass comprises at least one of $B_2O_3$, $P_2O_5$ and $R_2O$, and the antimicrobial agent is cuprite comprising a plurality of $Cu^{1+}$ ions.

Aspect (12) of this disclosure pertains to the article of any one of Aspects (1) through (11), wherein an exposed surface portion of the antimicrobial composite region exhibits at least a log 2 reduction in a concentration of at least one of *Staphylococcus aureus, Enterobacter aerogenes*, and *Pseudomonas aeruginosa* bacteria under a Modified EPA Copper Test Protocol.

Aspect (13) of this disclosure pertains to the article of any one of Aspects (1) through (12), wherein an exposed surface portion of the antimicrobial composite region exhibits at least a log 3 reduction in a concentration of at least one of *Staphylococcus aureus, Enterobacter aerogenes*, and *Pseudomonas aeruginosa* bacteria under a Modified EPA Copper Test Protocol.

Aspect (14) of this disclosure pertains to the article of any one of Aspects (1) through (13), wherein the first plurality of particles has a size distribution defined by a 325 standard US mesh size.

Aspect (15) of this disclosure pertains to the article of any one of Aspects (1) through (14), wherein the phase-separable glass comprises between about 10 and 50 mol % cuprite.

Aspect (16) of this disclosure pertains to the article of Aspect (2), wherein an exposed portion of the antimicrobial composite film is configured as a high touch surface of an element selected from the group consisting of a cover screen for a display device, a housing for a display device, a counter-top, a table-top, a door knob, a rail, and an elevator control panel.

Aspect (17) of this disclosure pertains to the article of Aspect (6), wherein the primary surface of the bulk element is configured as a high touch surface of an element selected from the group consisting of a cover screen for a display device, a housing for a display device, a counter-top, a table-top, a door knob, a rail, and an elevator control panel.

Aspect (18) of this disclosure pertains to a method of making an antimicrobial article, comprising the steps: mixing particles comprising a phase-separable glass with a copper-containing antimicrobial agent with a matrix precursor comprising polymeric particles to define an antimicrobial mix; and forming the antimicrobial mix into an antimicrobial composite film comprising a matrix and a first plurality of the particles within the matrix at a volume fraction.

Aspect (19) of this disclosure pertains to the method of Aspect (18), further comprising: affixing the antimicrobial composite film to a primary surface of a bulk element.

Aspect (20) of this disclosure pertains to the method of Aspect (18) or Aspect (19), wherein the forming step comprises extruding the antimicrobial mix into the antimicrobial composite film, and the polymeric particles are thermoplastic particles.

Aspect (21) of this disclosure pertains to the method of any one of Aspect (18) through Aspect (20), wherein the forming step is conducted at a predetermined temperature and a predetermined time, the predetermined temperature and time based at least in part on a compatibility evaluation of the antimicrobial mix.

Aspect (22) of this disclosure pertains to the method of Aspect (21), wherein the predetermined temperature and time are set such that the matrix precursor experiences a loss of no more than 10% by weight during the forming step.

Aspect (23) of this disclosure pertains to the method of any one of Aspect (18) through Aspect (22), wherein the bulk element comprises a polymeric material, and further comprises a second plurality of particles characterized by an elastic modulus greater than the elastic modulus of the polymeric material of the bulk element.

Aspect (24) of this disclosure pertains to the method of any one of Aspect (18) through Aspect (23), wherein an exposed surface portion of the antimicrobial composite film is configured as a high touch surface of an element selected from the group consisting of a cover screen for a display device, a housing for a display device, a counter-top, a table-top, a door knob, a rail, and an elevator control panel.

Aspect (25) of this disclosure pertains to a method of making an antimicrobial article, comprising the steps: forming a bulk element having a primary surface and comprising a polymeric material; and pressing particles comprising a phase-separable glass with a copper-containing antimicrobial agent into the primary surface of the bulk element to define an antimicrobial composite region, wherein the antimicrobial composite region comprises: a matrix comprising a polymeric material, and a first plurality of the particles within the matrix at a volume fraction.

Aspect (26) of this disclosure pertains to the method of Aspect (25), wherein the bulk element is a film, the pressing step comprises embossing the particles into the primary surface of the bulk element, and the antimicrobial composite region is an antimicrobial composite film.

Aspect (27) of this disclosure pertains to the method of Aspect (26), further comprising the step: affixing the antimicrobial composite film to a primary surface of a second bulk element.

Aspect (28) of this disclosure pertains to the method of Aspect (27), wherein an exposed surface portion of the antimicrobial composite film is configured as a high touch surface of an element selected from the group consisting of a cover screen for a display device, a housing for a display device, a counter-top, a table-top, a door knob, a rail, and an elevator control panel.

Aspect (29) of this disclosure pertains to the method of any one of Aspect (25) through Aspect (28), wherein the pressing step comprises embossing the particles into the primary surface of the bulk element to define the antimicrobial composite region, and further wherein the antimicrobial composite region extends from the primary surface of the bulk element to a first selected depth.

Aspect (30) of this disclosure pertains to the method of Aspect (29), wherein the bulk element further comprises a second plurality of particles characterized by an elastic modulus different than the elastic modulus of the polymeric material of the bulk element.

It will be apparent to those skilled in the art that various modifications and variations can be made without departing from the spirit or scope of the invention.

What is claimed is:

1. A method of making an antimicrobial article, comprising the steps:
    mixing particles comprising a phase-separable glass with a copper-containing antimicrobial agent with a matrix precursor comprising polymeric particles to define an antimicrobial mix;
    forming the antimicrobial mix into an antimicrobial composite film comprising a matrix and a first plurality of the particles within the matrix at a volume fraction; and
    affixing the antimicrobial composite film to a primary surface of a bulk element;
    wherein the affixing comprises lamination or hot pressing.

2. The method of claim 1, wherein the forming step comprises extruding the antimicrobial mix into the antimicrobial composite film, and the polymeric particles are thermoplastic particles.

3. The method of claim 1, wherein the bulk element comprises a polymeric material, and further comprises a second plurality of particles characterized by an elastic modulus greater than the elastic modulus of the polymeric material of the bulk element.

4. The method of claim 1, wherein the forming step comprises injection molding.

5. The method of claim 1, wherein the matrix comprises polyolefin, a polysulfone, or any combination thereof.

6. The method of claim 5, wherein the matrix comprises polyolefin, and the polyolefin is polyethylene, polypropylene, cyclicpolyolefin, or any combination thereof.

7. The method of claim 1, wherein the matrix comprises polystyrene, high impact polystyrene, polycarbonate, polyamide, poly(acrylonitrile-butadiene-styrene), polybutyleneterephthlate, polybutyleneterephthlate copolymer, polyethyleneterephthalate, polyethyleneterephthalate copolymer, modified polyphenylene oxide, polyvinylchloride, acrylic polymer, thermoplastic elastomer, thermoplastic urethane, polyetherimide, or any combination thereof.

8. The method of claim 1, wherein the matrix comprises epoxy, acrylic, styrenic, phenolic, melamine, urethane, polyester, silicone resin, or any combination thereof.

9. The method of claim 1, wherein the phase-separable glass comprises at least one of $B_2O_3$, $P_2O_5$ and $R_2O$, wherein R is one or more of K, Na, Li, Rb, and Cs.

10. The method of claim 1, wherein the phase-separable class comprises $P_2O_5$ and $K_2O$.

11. The method of claim 1, wherein the copper-containing antimicrobial agent comprises cuprite comprising a plurality of $Cu^{1+}$ ions.

12. The method of claim 1, wherein an exposed surface portion of the antimicrobial composite film exhibits at least a log 2 reduction in a concentration of at least one of *Staphylococcus aureus, Enterobacter aerogenes*, and *Pseudomonas aeruginosa* bacteria under a Modified EPA Copper Test Protocol.

13. The method of claim 1, wherein an exposed surface portion of the antimicrobial composite film exhibits at least a log 3 reduction in a concentration of at least one of *Staphylococcus aureus, Enterobacter aerogenes*, and *Pseudomonas aeruginosa* bacteria under a Modified EPA Copper Test Protocol.

14. The method of claim 1, wherein an exposed surface portion of the antimicrobial composite film is configured as a high touch surface of an element selected from the group consisting of a cover screen for a display device, a housing for a display device, a counter-top, a table-top, a door knob, a rail, and an elevator control panel.

15. The method of claim 1, wherein the antimicrobial composite film is integral with the primary surface of the bulk element.

16. The method of claim 1, wherein a portion of the bulk element is devoid of the first plurality of particles.

17. The method of claim 2, wherein the matrix and the first plurality of particles are collectively characterized by compatibility in which no more than 5% of the matrix by weight is lost during extrusion of the antimicrobial mix at a temperature of less than 300° C.

18. A method of making an antimicrobial article, comprising the steps:
mixing particles comprising a phase-separable glass with a copper-containing antimicrobial agent with a matrix precursor comprising polymeric particles to define an antimicrobial mix;
forming the antimicrobial mix into an antimicrobial composite film comprising a matrix and a first plurality of the particles within the matrix at a volume fraction; and
affixing the antimicrobial composite film to a primary surface of a bulk element;
wherein the matrix comprises a polysulfone; and
wherein the affixing comprises lamination or hot pressing.

19. A method of making an antimicrobial article, comprising:
extruding a mixture of polymer and copper-containing phase-separable glass into an antimicrobial composite film; and
affixing the antimicrobial composite film to a primary surface of a bulk element;
wherein the affixing comprises lamination or hot pressing.

\* \* \* \* \*

UNITED STATES PATENT AND TRADEMARK OFFICE
CERTIFICATE OF CORRECTION

PATENT NO. : 11,871,751 B2  
APPLICATION NO. : 17/388073  
DATED : January 16, 2024  
INVENTOR(S) : Dayue Jiang et al.

Page 1 of 1

It is certified that error appears in the above-identified patent and that said Letters Patent is hereby corrected as shown below:

In the Claims

In Column 30, Lines 51-52, in Claim 7, delete "polybutyleneterephthlate, polybutyleneterephthlate copolymer," and insert -- polybutyleneterephthalate, polybutyleneterephthalate copolymer, --.

Signed and Sealed this  
Sixteenth Day of July, 2024

Katherine Kelly Vidal  
*Director of the United States Patent and Trademark Office*